Dec. 4, 1951 R. P. ARTHUR 2,577,067
CROSSBAR SWITCH
Filed Feb. 17, 1948 9 Sheets-Sheet 3
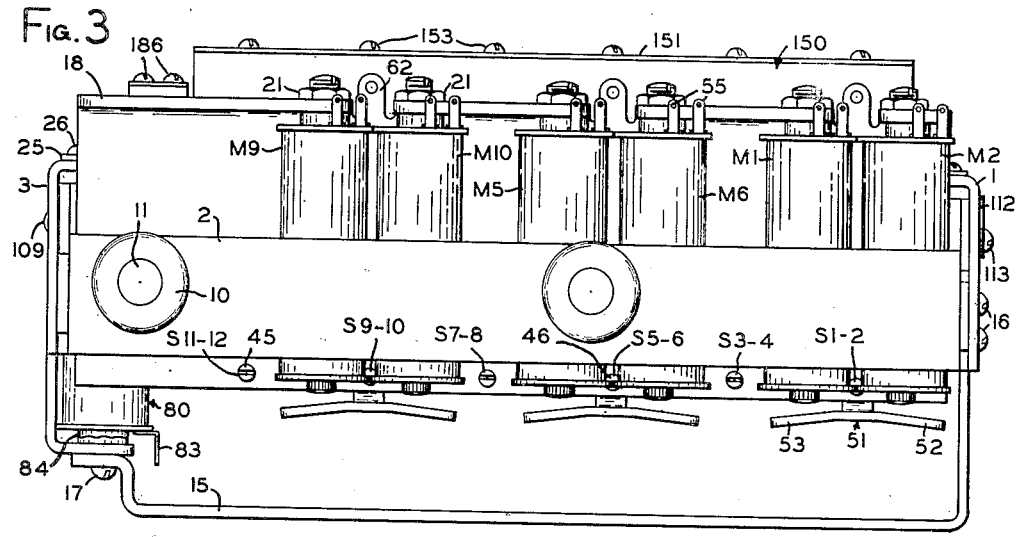
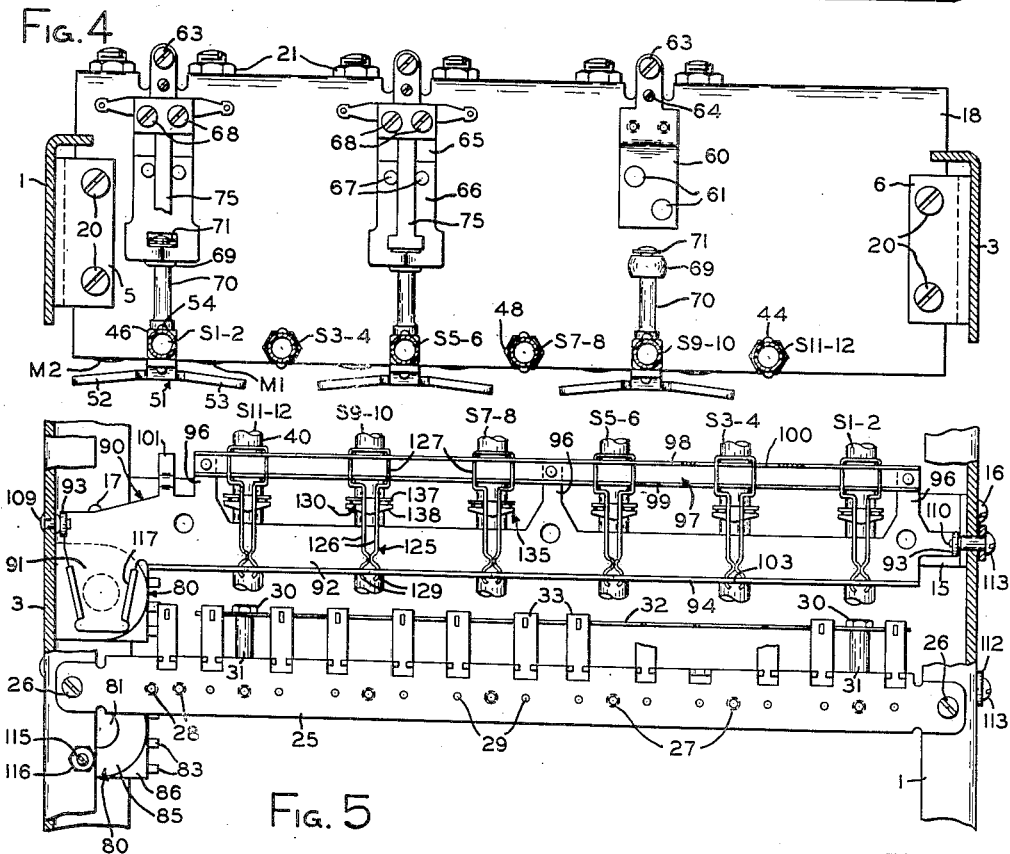
INVENTOR:
RICHARD P. ARTHUR
ATTORNEY Dec. 4, 1951 R. P. ARTHUR 2,577,067
CROSSBAR SWITCH
Filed Feb. 17, 1948 9 Sheets-Sheet 4

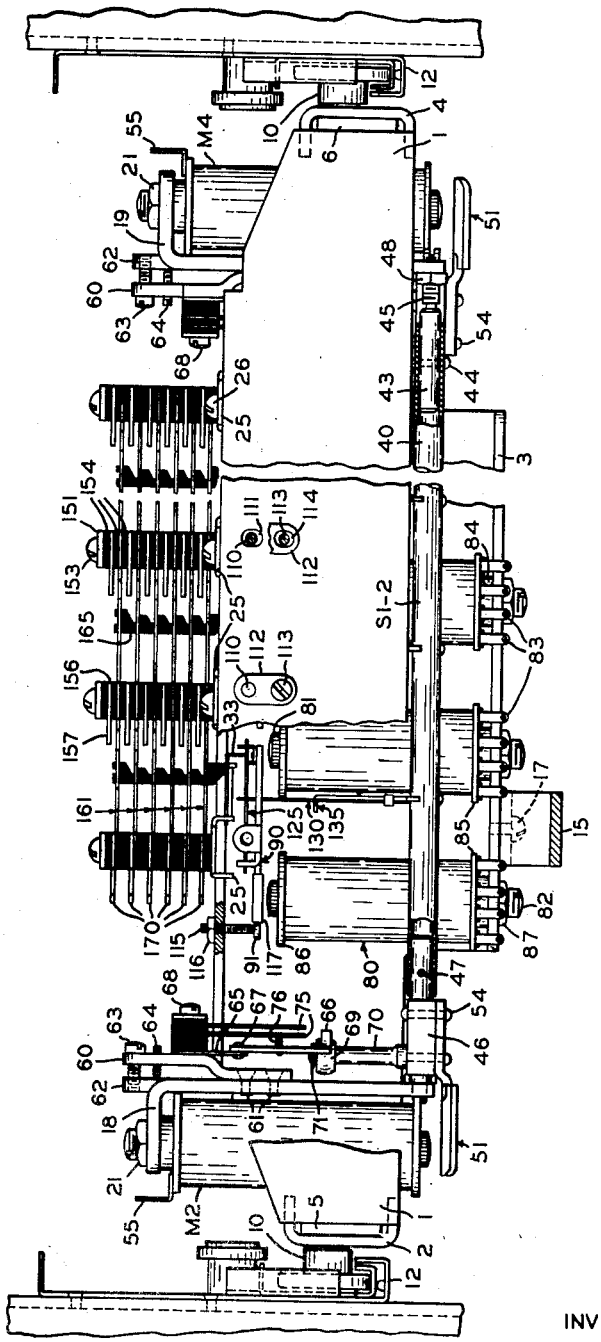

INVENTOR:
RICHARD P. ARTHUR
BY
ATTORNEY

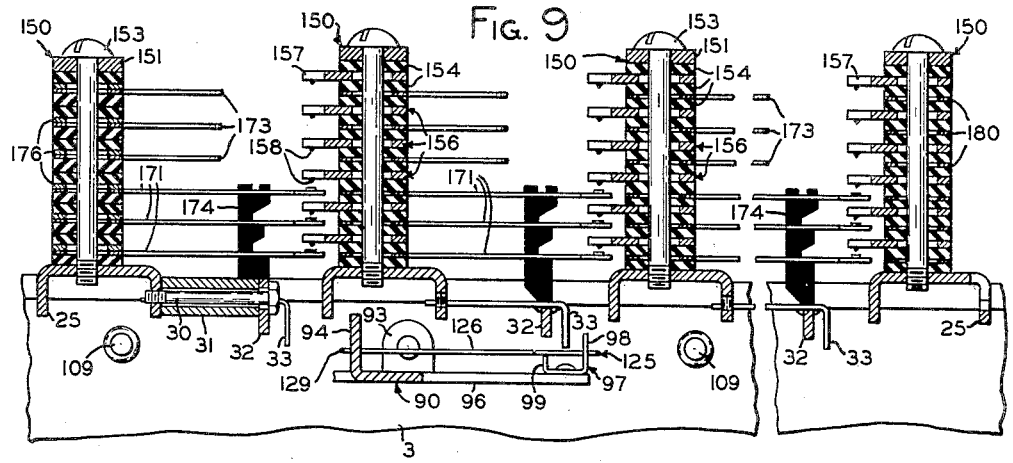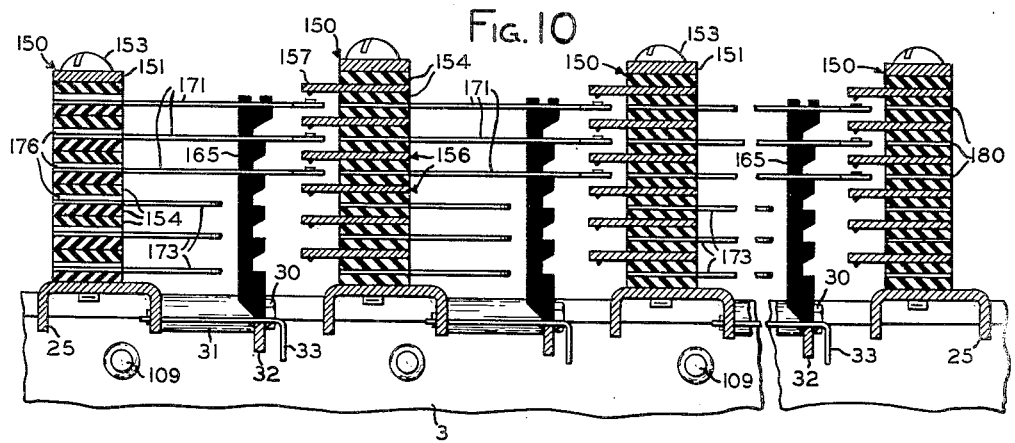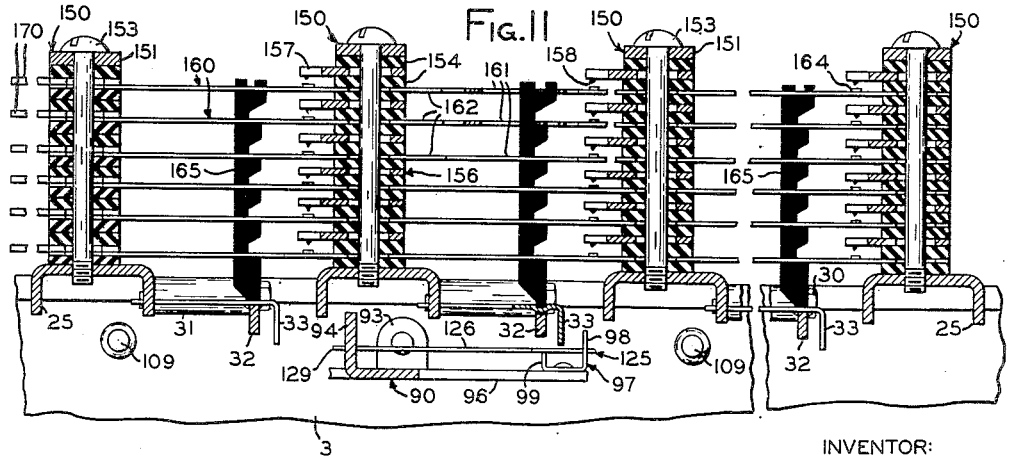

Dec. 4, 1951   R. P. ARTHUR   2,577,067
CROSSBAR SWITCH
Filed Feb. 17, 1948   9 Sheets-Sheet 6
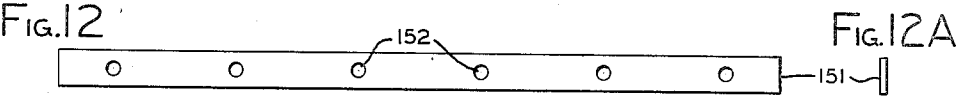
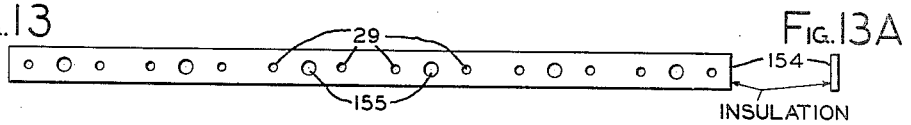
INSULATION
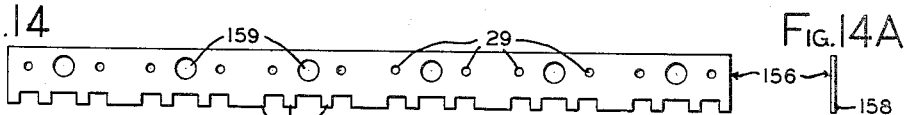
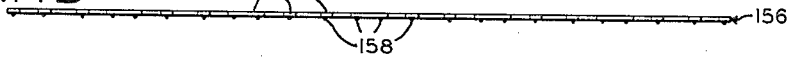
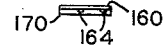
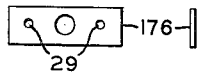
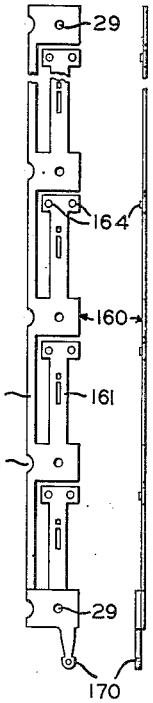
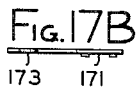
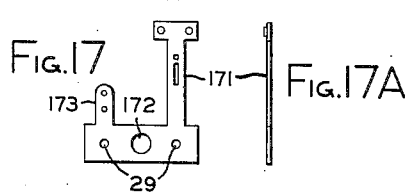
INVENTOR:
RICHARD P. ARTHUR
ATTORNEY Dec. 4, 1951   R. P. ARTHUR   2,577,067
CROSSBAR SWITCH
Filed Feb. 17, 1948   9 Sheets-Sheet 7
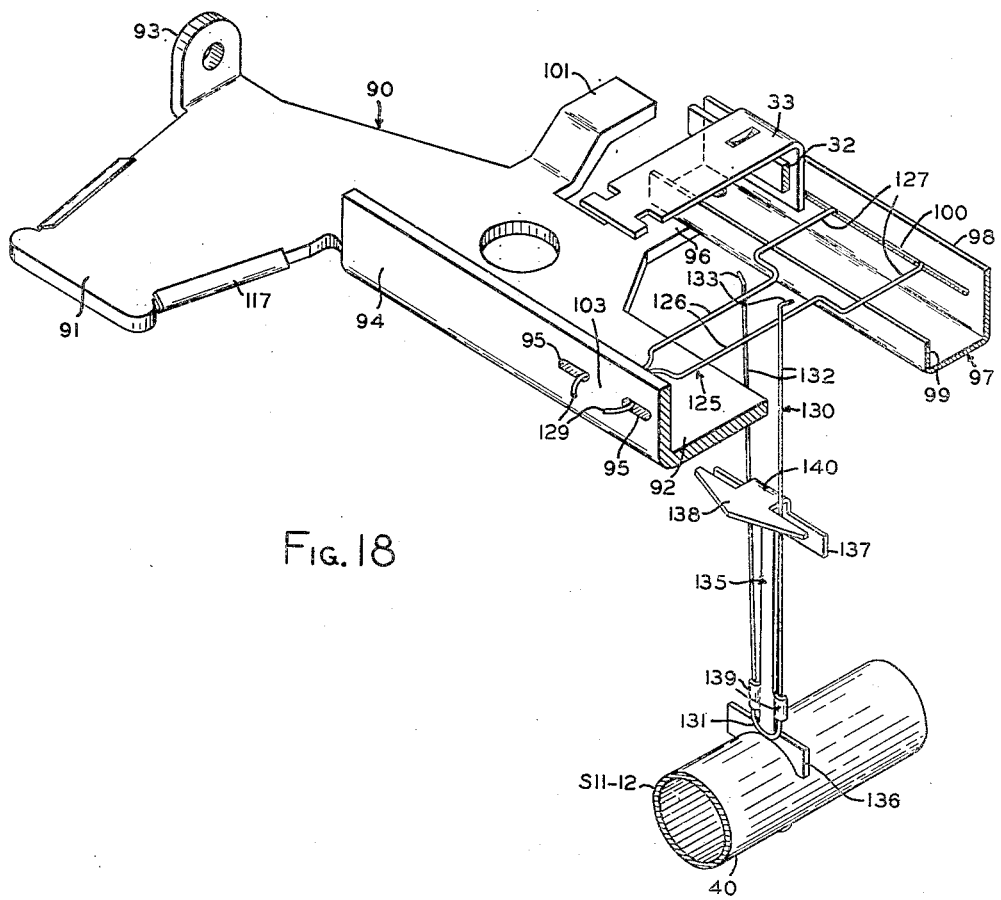
INVENTOR:
RICHARD P. ARTHUR
BY *C. P. Soper*
ATTORNEY Dec. 4, 1951  R. P. ARTHUR  2,577,067
CROSSBAR SWITCH
Filed Feb. 17, 1948  9 Sheets-Sheet 8
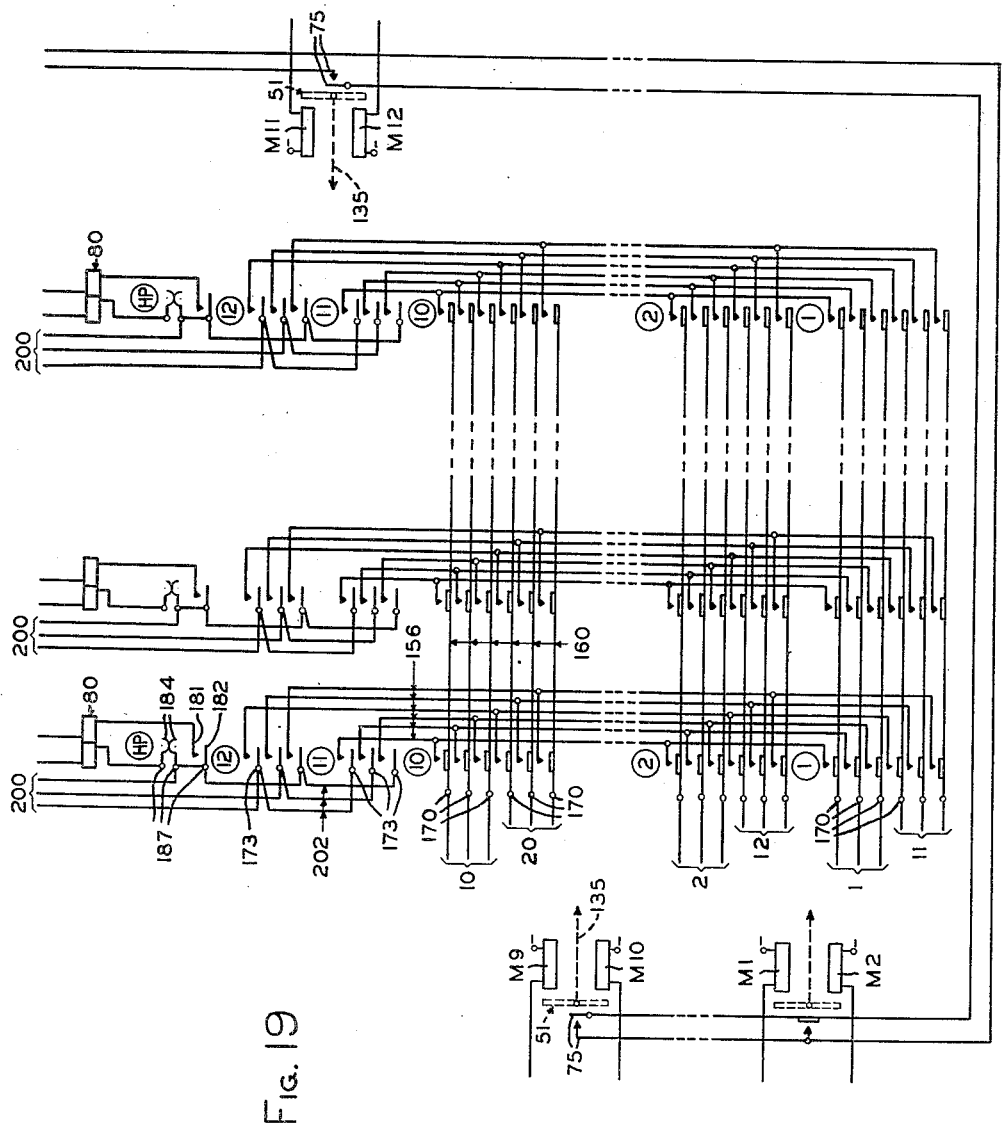
INVENTOR:
RICHARD P. ARTHUR
ATTORNEY Dec. 4, 1951     R. P. ARTHUR     2,577,067
CROSSBAR SWITCH
Filed Feb. 17, 1948     9 Sheets-Sheet 9
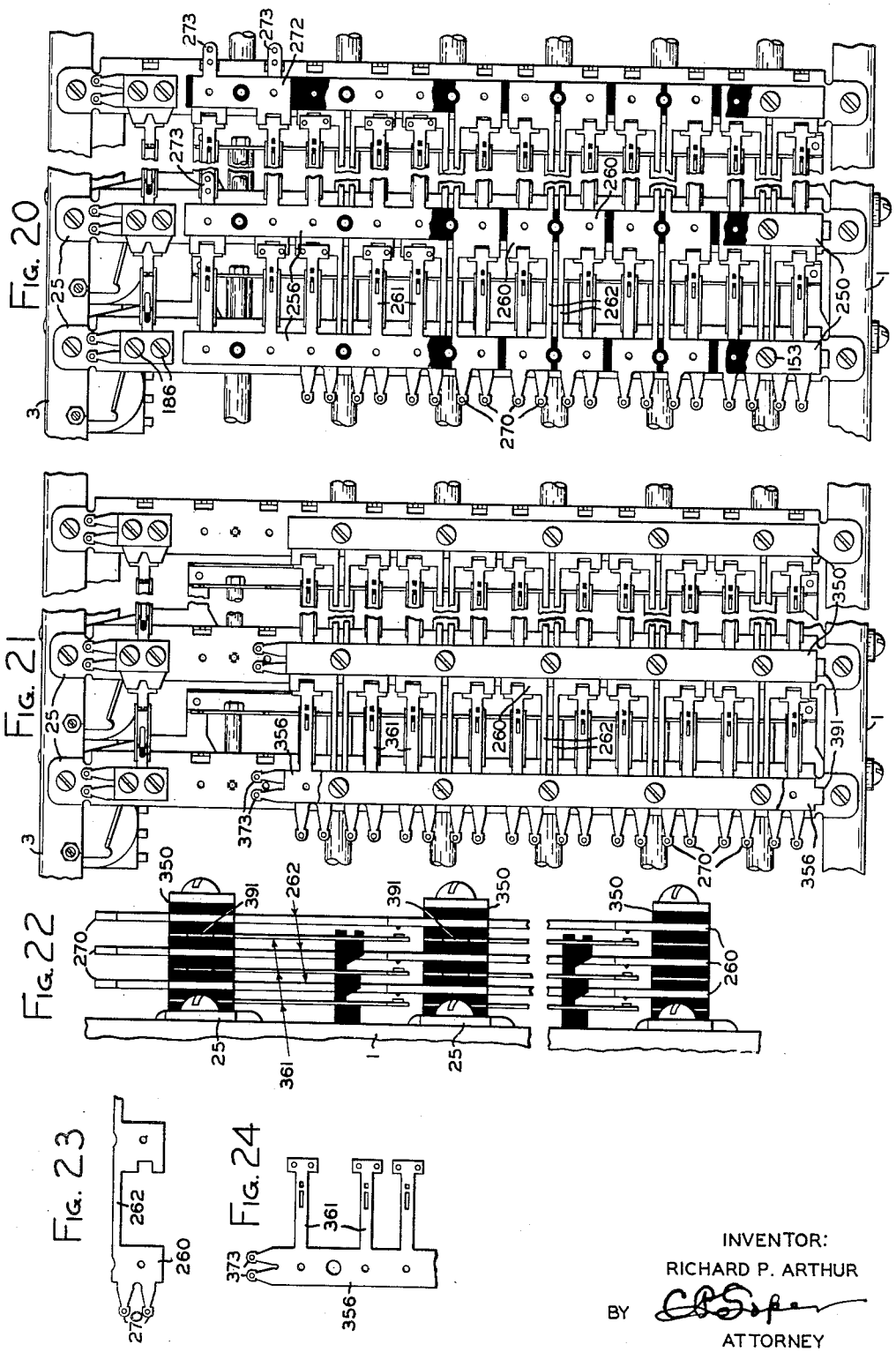
INVENTOR:
RICHARD P. ARTHUR
BY
ATTORNEY Patented Dec. 4, 1951

2,577,067

UNITED STATES PATENT OFFICE 2,577,067

CROSSBAR SWITCH

Richard P. Arthur, Des Plaines, Ill., assignor to Kellogg Switchboard and Supply Company, Chicago, Ill., a corporation of Illinois Application February 17, 1948, Serial No. 8,900

22 Claims. (Cl. 179—27.54)

This invention relates to a crossbar switch such as is used in automatic telephone systems and elsewhere. The main object of the invention is the production of a new and improved crossbar switch of simple, reliable, and economical construction.

GENERAL DESCRIPTION

A crossbar switch is one having permanently paired contact members comprising sets (or stackups) arranged in intersecting rows, hereinafter respectively termed vertical rows and horizontal rows. Selecting bars (or shafts) extend along the horizontal rows to select the stackups therein. Hold bars (or armatures), extend respectively along the vertical rows to actuate, and hold, selected stackups.

In the improved construction herein disclosed, the crossbar switch includes a rectangular frame structure supporting the above-noted stackups of contacts in the form of a unitary bank built up of horizontal conducting strips and vertical conducting strips, alternating in layers to form a multi-level grid. These conducting strips are supported and insulated from each other by clamped pileups coinciding respectively with the succeeding groups of superposed vertical conducting strips. The conducting strips are so shaped and arranged that they provide the contact members of the stackups, and also constitute the required vertical and horizontal conductors multiply interconnecting such contact members. The usual applied inter-stackup wiring is thereby obviated. Moreover, this construction reduces the number of parts required to be produced and assembled, and it makes possible the disclosed arrangement wherein one side of the contact bank is entirely unobstructed, to permit ready inspection and adjustment of the individual contact members of a stackup.

Additional features of the invention include the following:

1. The free end of each of the flexible contact springs is T-shaped. This enables a pair of contact points to be applied thereto relatively far apart, and each displaced laterally of the main spring portion. It has the advantage of enhancing direct visual inspection of the contact parts from the top of the bank, and enhancing indirect visual inspection, as through a bifurcate mirror straddling the main portion of the springs of a stackup. This construction further promotes stable twin-contact operation, since the wide spacing of the contact points insures that the spring member will twist, when necessary, to enable both contact points to engage firmly.

2. The stackup-actuating members, which respectively underlie the stackups, comprise individual pivoted levers rather than spring blades as heretofore. This construction eliminates the additional spring load heretofore imposed by the actuating springs, as well as providing increased dimensional stability.

3. Each vertical row of stackups is provided with a common backstop rail, underlying the actuating members of the stackups. This backstop rail is adjustably supported at two points near its ends to permit it to be raised or lowered, and to be "levelled," as desired, to bring the contact springs of the several stackups of the vertical row into the same normal position with respect to their fixed contact parts.

4. Each of the hold armatures (hold bars) is pivotally mounted between the front and rear rails of the switch frame. Associated adjustment facilities greatly increase permissible manufacturing tolerances by permitting the following three separate adjustments of the hold armature: (a) adjustment of one bearing location (the front one) toward and away from the contact bank to "level" the armature therewith, (b) adjustment of the normal, or backstop, position of the armature to a point where the several select levers carried thereon are freely movable between the armature and the actuating members which they underlie, with a minimum of lost motion upon operation of the armature, and (c) adjustment of the forward (frontstop) position of the armature to a point where any stackup to be actuated is brought to its closed position at the desired point in the travel of the armature to insure the application of the correct contact pressure.

5. The adjustment of the frontstop position of the hold armature is effected by adjusting the core of the associated electromagnet longitudinally within its relatively fixed coil, by a simple rotation of the core, which is screw-threaded in position.

6. A further feature resides in a simplified and improved V-slot centering arrangement for the selecting shafts, which permits a simple construction of the related supporting parts, and in the provision of an improved shaft-restoring spring assembly which is readily adjustable to provide the desired restoring force.

7. A still further feature relates to a new and improved arrangement especially adapted to effect stackup selection in a contact bank of the new and improved type disclosed.

Other objects and features of the invention will appear as the description progresses.

Figs. 1 to 19 of the accompanying drawings show a preferred embodiment of the invention, while Figs. 20 to 23 show a desirable modification of the construction of the contact bank.

Fig. 2 is a front view of the switch installed as part of a switchboard.

Fig. 3 is a left view of the switch.

Fig. 4 is a right sectional view, taken along line 4—4 of Fig. 1.

Figs. 5 and 6 are fragmentary top views of portions of the switch.

Figure 1:
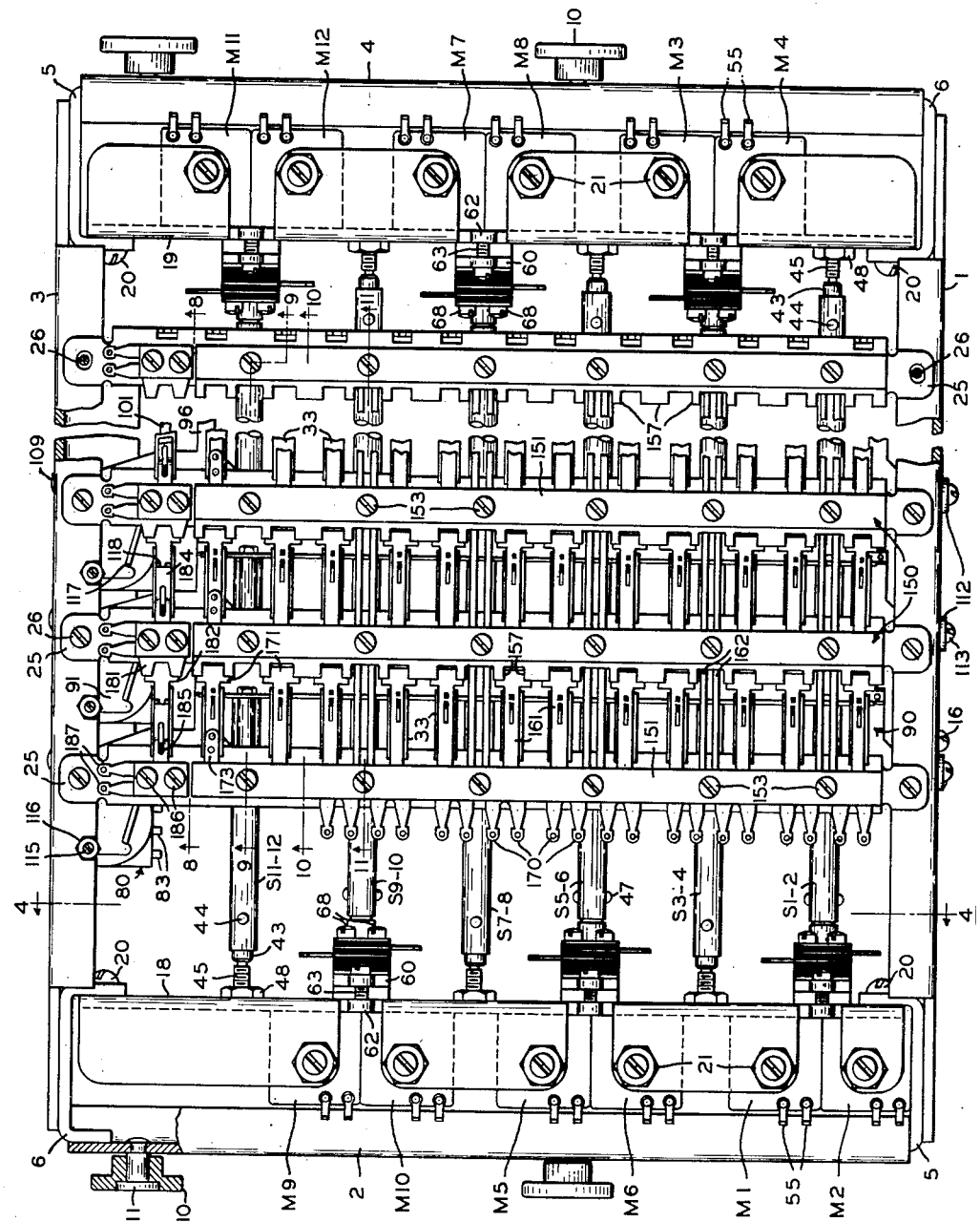
Fig. 1 is a top view of the switch of Figs. 1 to 19.

Figs. 8, 9, 10, and 11 are fragmentary front sectional views taken respectively along lines 8—8, 9—9, 10—10, and 11—11 of Fig. 1.

Figs. 12, 13, and 14, together with their respective auxiliary views, respectively show a top clamp strip, an insulator strip, and a conducting vertical contact strip used in the several clamping pileups of the contact bank.

Figs. 15, 15A, and 15B show a conducting horizontal contact strip used in the contact bank.

Figs. 16 and 17, together with their respective auxiliary views, respectively show a metal spacer and a contact spring used in the eleventh and twelfth (extension) stackups of each vertical row of the contact bank.

Fig. 18 shows a schematic view of a select-lever and associated selecting and hold mechanism.

Fig. 19 is a schematic circuit diagram of the switch of Figs. 1 to 18.

Fig. 20 is a partial top view of the switch of Figs. 1 to 19 equipped with a contact bank of similar capacity, but of modified construction.

Fig. 21 is a similar view of the same switch, but equipped with a contact bank having no extension stackups.

Fig. 22 is an enlarged front view of the apparatus shown in Fig. 21.

Figs. 23 and 24 show the terminal-ends of partially completed conducting contact strips for use in the modified contact-bank construction.

DETAILED DESCRIPTION

The invention having been described generally, a detailed description of the disclosures will now be given.

I. CONSTRUCTION

A. *The frame structure*

Referring generally to Fig. 1, the rectangular frame structure shown therein consists of front and rear parallel rails 1 and 3 rigidly secured at the ends, as by welding, to end channels 2 and 4, by means of left and right-hand corner gussets 5 and 6.

The front rail 1 is an angle member. Its inwardly extending top flange containing tapped holes for receiving the screws 26 securing the front end of the bank-support channels 25 in place. The face of the front rail contains tapped holes and elongated openings to receive the adjustable armature-leveling plate assemblies 112.

The rear rail 3 is a channel member with inwardly extending upper and lower flanges. The upper flange contains tapped holes for receiving adjusting screws 115, and screws 26 which secure the rear end of support channels 25 in place. The lower flange serves as a mounting for hold magnets 80, and to this end it contains tapped holes receiving the threaded cores of such magnets. Rear rail 3 accordingly serves as a portion of the return path for the magnetic flux of the hold magnets, being of suitable magnetic material. The principal portion of rail 3 carries the rivetly attached armature bearing studs 109, as best seen in Fig. 5.

Two left-faced corner gussets 5 and two right-faced corner gussets 6 rigidly join, as by welding, the parallel rails 1 and 3 to the end channels 2 and 4. One portion of each such gusset 5 and 6 is flanged inwardly to provide a mounting space for shaft brackets 18 and 19, see Fig. 1.

Figure 6:
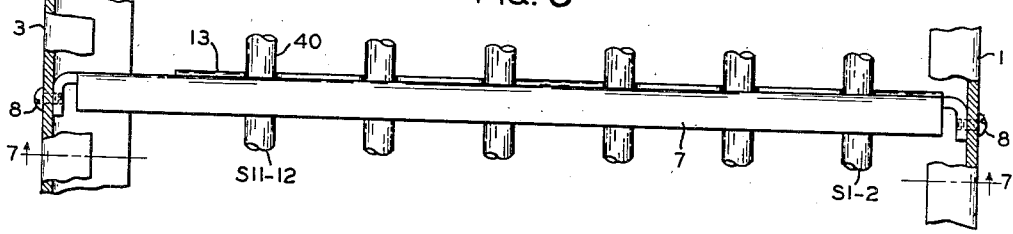
Figure 7:
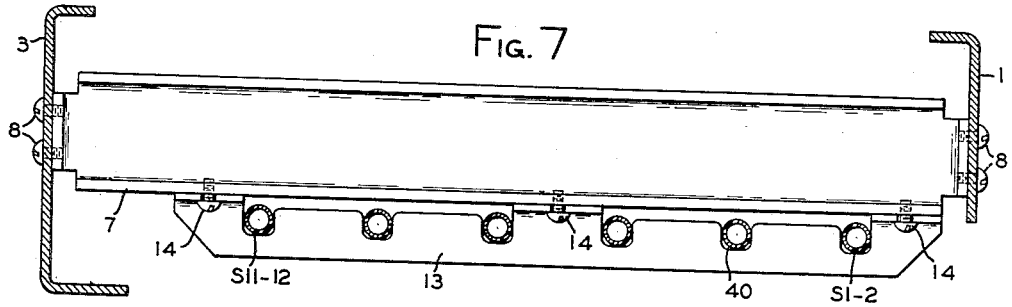
Fig. 7 is a left sectional view taken along line 7—7 of Fig. 6.

Figs. 6 and 7 show an intermediate cross brace 7, of channel construction with upper and lower legs. Sufficient of each leg portion, at the ends, is cut away to permit the ends of the web to be bent for attachment, by screws 8, to the front and rear rails 1 and 3. Brace 7 serves to strengthen the frame structure and to support the selecting shaft guide rail 13.

The shaft guide rail 13 comprises a plate-like member with turned flanged tabs containing slotted openings for securing the guide rail 13 to the lower leg of brace 7, by means of screws 14. The upper portion of shaft guide rail 13 contains accurately sized and spaced notches to freely receive the tubular portions 40 of the six selecting shafts, such as S1—2 for support and alignment.

B. *The mounting rollers*

Referring to Figs. 1 and 2 mounting rollers 10 are attached to end channels 2 and 4 by means of roller studs 11. As seen in Fig. 2, wherein the switch is shown mounted in a suitable switchboard frame (fragmentarily shown), rollers 10 are arranged to lie within the guide assembly 12, which is slidingly secured to the mounting frame, to permit the switch to be moved inwardly and outwardly (partly as a rolling action, and partly as a sliding action) in the manner of a drawer in steel cabinets of usual construction.

C. *The leg bails*

A pair of leg bails 15 underlie the frame structure. One such leg bail 15 is shown in Figs. 2 and 3. As shown therein, the leg bail 15 is attached to the rear face of front parallel mounting rail 1 by means of screws 16, and is attached to the lower flange of rear parallel mounting rail 3 by means of screw 17. The bails serve as support legs during assembly, wiring, and adjustment of the switch. They also may be used to add rigidity to the frame structure; support legs of cable wiring (not shown).

D. *The shaft brackets*

Two shaft brackets 18 and 19, extending across the frame structure, are shown in Figs. 1 to 4. Each such shaft bracket consists of an upstanding main portion and a horizontal portion flanged outwardly. The main portion of each such shaft bracket 18 and 19 is secured at the ends to corner gussets 5 and 6, by means of screws 20. The upstanding portion of brackets 18 and 19 supports the select shafts, the shaft-centering assemblies, and the assemblies of off-normal contacts. Three upwardly extending tabs 62 are integrally formed with each shaft bracket to serve as auxiliary adjustment supports for the shaft-centering means.

The flanged portion of the shaft brackets contains tapped holes to threadedly receive the cores of the select magnets for supporting and adjusting the select magnets M1 to M12. The shaft brackets 18 and 19 also serve as a portion of the return path for the magnetic flux of the select magnets M1 to M12.

E. *The support channels*

The support channels 25 consist of a top web portion, as shown in Fig. 5, with left and right leg portions extending downwardly, as viewed in cross section in Figs. 8, 9, 10, and 11. The end portions of the legs are cut away for suitably securing the web portions to the upper flanges of the parallel mounting rails 1 and 3, by means of screws 26. The holes in the web portion, through which screws 26 pass, are elongated to permit desired adjustments in the positioning of support channels 25. See Fig. 1.

The top web portion, as shown in Fig. 5, supports the stackups of contacts and the hold pilot assembly, and is provided with tapped holes 27 and 28 for this purpose. Apertures 29 are also provided in the web portion for holding dowel pins used only in aligning the stackups during assembly.

The web portion and right leg of support channel 25 contains slotted openings for pivotally mounting the actuating tabs 33, and the right leg contains tapped holes for receiving the back-stop rail supporting screws 30.

F. *The back-stop rails*

The backstop rails 32, as shown in Fig. 5, comprise narrow flat plate-like members, vertically extending across the frame structure, with the flat sides paralleling the right legs of the support channels 25. The top edge is notched to readily receive the depressed portion of the actuating tabs 33, and the flat portion contains elongated openings for the passing of backstop rail supporting screws 30.

The backstop rails 32 are secured to the right leg portions of support channels 25 by screws 30, and maintained in proper position by means of spacers 31. The elongated apertures in guide rails 32, through which screws 30 pass, permit the guide rails 32 to be adjusted upwardly or downwardly as is required for positioning the actuating tabs 33.

The backstop rails 32 serve as a positioning support member and as an adjustable backstop for the front portions of the actuating tabs 33. The adjustable backstop rails further serve to properly position the spring contacts 161 and 171 of the stackup, in relation to their fixed contact members 157, as will be subsequently disclosed.

G. *The actuating tabs*

The actuating tabs 33, one of which is shown in Fig. 18, comprise generally a flat top portion and a downwardly extending flanged portion. The top portion of each tab 33 is notched on each edge near the end for pivotally mounting the tab in the apertures provided for in the support channels 25. See Fig. 5.

The top portion of actuating tab 33 is depressed near the front to provide a socket for the stackup lifter studs 165, etc. The downwardly protruding depressed portion, lies within the notched portions of the backstop rails 32, to permit the front top portion of the actuating tabs 33 to lie flat upon the backstop rail 32 during inactuated periods.

The actuating tabs 33 are positioned by the adjustable backstop rails 32, one such rail positionally supporting all the actuating tabs 33 underlying each vertical group of stackups comprising a contact bank 150.

The adjustably mounted armature 90, supporting the selecting levers 125, may be upwardly or downwardly adjusted for clearance, sufficient to permit the selecting levers 125 to assume their alternate selective positions underlying the edge of the downwardly extending flanged portion of the actuating tabs 33, in response to the action of the selecting mechanism for stackup actuation.

H. *The selecting shafts*

The six selecting shafts S1—2, S3—4, S5—6, S7—8, S9—10, and S11—12, shown in Fig. 1, are all of similar construction; a side view of shaft S1—2 being shown in Fig. 2. Each such shaft comprises essentially a metal tube 40, having integrally-formed finger guides 135 (see Fig. 18), through which the selective action of the shaft is performed incidental to the rotation of the shaft about its longitudinal axis.

As shown in Fig. 2, bearing rod 43, composed of suitable bearing material, is inserted in the hollow portion of shaft 40 at one end, and retained in position by a rivet 44. The end portion of rod 43 is cupped to receive the supporting spherical smooth end portion of an adjustable bearing screw 45. The body of the screw 45 is threaded into its tapped hole in shaft bracket 19, with sufficient of the slotted head portion extending through the shaft bracket 19 to permit screw driver adjustment. Screw 45 serves as an adjustment means for the regulation of any shaft end play. The screw 45 is provided with a locking hexagonal nut 48 to lock the screw in a desired position. This arrangement is advantageous in that the selecting shaft can be adjusted to turn freely with a minimum amount of friction and to compensate for any slight differences in shaft lengths occurring in construction. Further, the selecting shafts are readily mountable and demountable.

As previously described, a selecting shaft guide rail 13 may be provided in switches using long selecting shafts to support the shafts at the center and to prevent damage to such rods, as a result of improper handling. See Fig. 7. The rails 13 give greater stability to the frame structure and to the selecting shafts, prevent side to side deviation, and assist in keeping the shafts in proper alignment.

The other ends of the selecting shafts are supported in the following manner. An armature-bearing block 46, composed of suitable bearing material, has an inner cylindrical end portion inserted in the hollow end portion of rod 40 and is secured in position by a rivet 47. The outer end portion of block 46 is turned to form a collar section of reduced diameter to reduce friction between the bearing block and the shaft bracket 18. The collar section is turned to form a bearing pin of smaller diameter for insertion in a smooth hole drilled in shaft bracket 18, to permit the shaft rods S1—2, etc. to turn freely in response to the selective action of select magnets M1, M2, etc.

It will be observed that the first, third, and fifth of the selecting shafts of a group are all assembled in the same manner with the armature 51 thereof at the left of the frame structure, as viewed in Fig. 1, while the second, fourth, and sixth are assembled in reverse position, the armatures of the latter being at the right. Accordingly, the magnets M1 and M2, M5 and M6, and M9 and M10, for the first, third, and fifth shafts, are located on the left shaft bracket 18, while the magnets M3 and M4, M7 and M8, and M11 and M12, for the second, fourth, and sixth shafts are located on the right shaft bracket 19.

Armatures 51 are provided for the select shafts as shown in Figs. 2 to 4. Each comprise a plate-like main tractive portion, and an integrally-formed offset portion which is secured to the under side of armature-bearing block 46, by the riveted lower extending portion of roller stud 70 and by rivet 54.

Armature 51 has a pair of wing portions 52 and 53 formed integrally therewith and arranged to be acted upon by the respective select magnets M1 and M2. The normal relationship between wings 52 and 53 of any shaft and the associated select magnets (such as M1 and M2) is illustrated in Fig. 3.

The offset armature 51 is so placed with reference to shaft brackets 18 or 19, that in attracted position only a very narrow gap exists between the back portion of the armature and the shaft bracket. Thus, when one of the magnets, such as M1 or M2 (see Fig. 2), is energized, the magnetic flux passes from the front end of the magnet to the associated wing (52 or 53) of the concerned armature 51, whence it traverses the small air gap between the back portion of armatures 51 and the shaft bracket (18 or 19), and returns through the shaft bracket to the rear end of the energized magnet. The concerned armature wing 52 or 53 is thereby attracted into engagement with the energized magnet, causing rotation of the concerned selecting shaft in one direction or another. It will be noted that the armature 51 is offset to avoid the necessity of cutting away portions of the shaft brackets 18 and 19, and is so designed that each wing 52 or 53 in attracted position lies flatly upon the front core of the selecting magnets M1, etc. for increased contact surface.

The front stop position of armature wings 52 or 53 is adjustable by adjusting the select-magnet (M1, M2, etc.) cores longitudinally. As shown in Fig. 3, the core of each of such magnet, M1 and M2, etc., is threaded in the flange of bracket 18 or 19; is locked in position by retaining nut 21; and is arranged to turn freely within its coil to provide adjustment of the stroke of armature 51.

I. *The shaft positioning assembly.*

A shaft positioning assembly is provided to return the selecting shafts S1—2, etc., to their normal (unoperated) position after the selective action of such shafts has been completed. Such an assembly, as shown in Figs. 2 and 4, consists essentially of an adjustable support bracket 60, a cam spring 65 and cam member 66, and cooperates with a shaft roller 69 and stud 70.

Each of the shaft brackets 18 and 19 has three offset support brackets 60 (Fig. 2). The lower end of each is secured to its shaft bracket 18 or 19 by rivets 61, and the upper, inwardly offset, portion is adjustably secured to a vertical tab 62 by means of interlocking adjustment screws, comprising pull-in screw 64 and push-out screw 63, through which it may be readily bent toward or away from its shaft bracket, and locked in position with both screws tight.

Screw 63 passes through a clearance hole in bracket 60, and is threadedly received within a tapped hole in its mounting tab 62. When screw 63 is tightened, its head pulls the offset portion of the bracket 60 inwardly with respect to shaft bracket 18 or 19 to a stop position determined by the current setting of screw 64.

The adjusting set screw 64 is threaded into a tapped hole in the offset portion of bracket 60, and its rounded front end portion bears against the shaft bracket (18 or 19). Thus, by tightening screw 64, the end portion of such screw pushes against the shaft bracket (18 or 19) to move the upper offset portion of bracket 60 outwardly from such bracket 18 or 19. Thus, the opposed-drive adjusting screws 63 and 64, acting together, result in a push-pull interlocking adjustment means for the support bracket 60.

The adjustable support brackets 60 carry the cam springs 65 and the shaft off-normal spring contacts 75, such cam springs 65 and spring contacts 75 and their associated spacing and insulating washers, being secured thereto by screws 68.

The cam spring 65 comprises a flat plate of spring steel, secured at the top to the flat offset portion of bracket 60, by means of screws 68. See Figs. 2 and 4. The downwardly-extending lower portion is secured to the cam member 66, by means of rivets 67. The cam member 66 comprises, in general, a plate-like structure formed with a V-notched cam portion at the lower end to engage the shaft positioning rollers 69. The cam members 66 are maintained in a properly-tensioned engagement with rollers 69, by means of the attached cam spring 65 which is secured to the adjustable support bracket 60. Thus, the previously-described adjustment of the support bracket 60 increases or decreases the tension of cam spring 65 and, consequently, the tension existing between the surface of the V-shaped portion of the cam member 66 and the engaged roller 69.

The selecting shaft positioning rollers 69 are arranged to lie within the centering V-shaped notched portion of cam member 66, and are mounted upon roller stud 70. The upper portion of roller stud 70 has a bearing shoulder upon which roller 69 is maintained in position. The upper portion of roller stud 70 is turned to form a supporting axle, upon which roller 69 revolves. The roller 69 is provided with a bearing washer 71 to reduce friction at the end, and both roller 69 and washer 71 are secured in position by the riveted upper end portion of stud 70.

The extended lower portion of stud 70 extends through an aperture in select-shaft armature bearing block 46, and on through an aperture in the offset arm of armature 51, and is rigidly secured in place by riveting the lower end of such stud.

It will be noted at this point that, as a selecting shaft such as S1—2 is rotated in one direction or the other in response to the energization of one of the other of select magnets M1 or M2, the shaft roller stud 70 moves in the same direction. The roller 69 then leaves the center of the V notch in cam member 66, and moves toward the inclined sides of the notch and, in so doing, extends the cam member 66 back further against the tensioned cam spring 65. Immediately upon deenergization of the select magnet, the tension of the V slot cam portion 66 engaging the roller 69 forces the roller to resume its center position in the V-shaped positioning notch. Consequently, the selecting shaft associated with such roller and stud resumes its normal position.

The shaft off-normal springs 75 are secured to support bracket 60 by means of screws 68. The cam member 66 carries an insulating stud 76 that acts upon the adjacent spring contact of springs 75 to cause the springs to make electrical contact with each other when the came member 66 is pushed inwardly incidental to the rotation of the associated select shaft S1—2. The shaft off-normal springs may thus be used for "pilot" purposes, to indicate to a control circuit that a shaft has been moved into a selecting position.

J. *The armature and hold magnet*

A hold magnet 80 and armature 90 is provided for each vertical row of stackups to operate selected stackups of contacts therein, and a stackup of hold-pilot contacts.

The hold magnets 80 are adjustably mounted, as shown in Fig. 2, upon the lower flanged portion of the rear mounting rail 3, below and slightly to the left of their associated vertical row of stackups. Each magnet 80 includes an energizing solenoid coil on a cylindrical magnetic core. Each such core passes through its coil, and has its upper end 81 increased in diameter (by knurling) to retain the coil in place, and has its lower end 82 threaded and end-slotted for mounting as a screw.

The coils of magnets 80 are provided with terminals 83 for external connections. An insulating collar 84 encircles the core between the rear spool head 85 and rail 3 to maintain the base portion of terminals 83 out of contact with rail 3. Rear spool heads 86 is square, wherefore it bears against the web portion of rail 3 to prevent the coil from turning.

The end portion 82 is threaded into a tapped aperture in the lower flange of rail 3 for supporting and longitudinally adjusting the position of magnets 80 to adjust the front stop position of armature 90. The slotted portions of threaded ends 82 are provided to facilitate adjustment, and a common hexagonal nut 87 is provided to lock the core in place after proper adjustment is made.

A hold-magnet armature 90 underlies each vertical row of stackups. Each is pivotally mounted at each end. A plan view of one such armature 90 is shown in Fig. 5, and cross sectional views are shown in Figs. 9 and 11.

Referring now particularly to Fig. 5, the armature 90 shown therein extends from rear rail 3 to front rail 1, being pivoted at each. It comprises two principal portions, formed integrally with each other, a tractive portion 91 which operatively overlies the upper end of the core of its corresponding hold magnet 80, and a laterally extending (main) portion 92 which underlies the associated row of stackups.

Armature 90 has a vertical mounting tab 93 at each end for pivotally mounting the armature on bearing pins 109 and 110, secured to the front and rear rails 3 and 1.

Portion 92 has an upwardly extending flange 94 containing six pairs of narrow slots 95. One such pair is shown in Fig. 18. The portion of flange 94 between the slots 95 of each pair serves as a pivot mounting for a select lever 125.

Figure 8:
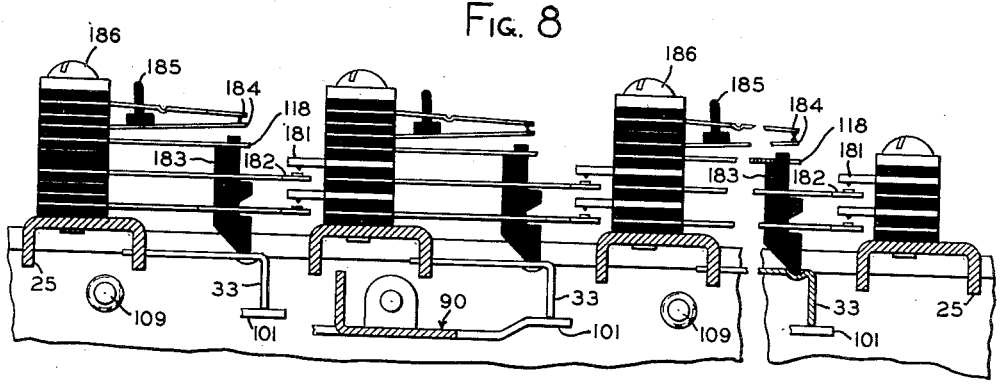

A tab-like upwardly offset portion 101 of armature 90 serves to actuate the associated hold-pilot contacts when the armature is operated. The hold-pilot assembly (as shown in Fig. 8) contains an armature returning spring 118 that serves to retain armature 90 to its illustrated normal position.

The main portion 92 of armature 90 has three integrally-formed support arms 96 to which a channel-shaped actuating bar 97 is rigidly secured, as by riveting.

A cross-sectional view of the actuating bar 97 (fragmentarily shown in perspective in Fig. 18) is shown in Figs. 9 and 11, and a top view is shown in Fig. 5. Bar 97 has a relatively short inner leg 99 acting as an intermediate support for the select levers 125, and a taller outer leg 98 which has six wide slots 100 for guidingly receiving select fingers 125. Each slot 100 is opposed in position to one of the pairs of slots 95 in flange 94 of armature 90 as shown best in Fig. 18.

The three holes appearing in the main portion 92 of armature 90 in Fig. 5 are used only during the formative period as pilot holes.

A residual clip 117 is provided, as shown in Fig. 18, and is attached to the tractive portion 91 of armature 90 to eliminate any undesirable residual magnetism. Referring now to Figs. 2 and 5, the magnetic return path for the hold magnets 80 will be described. Upon energization of one of the hold magnets 80, the magnetic flux passes from the front end of the magnet core to the tractive portion 91 of the concerned armature 90 and to the vertical mounting tab 93, whence it traverses the small air gap existing between tab 93 and rear rail 3, and returns through the rail 3 to the rear end of the energized magnet. The concerned tractive portion 91 is thereby attracted into engagement with the energized magnet, causing the actuating portion of armature 90 to operate.

The front stop of the armature 90 is regulated by the longitudinal adjustment of the hold magnets 80, as heretofore described, and the backstop is regulated as shown in Fig. 2 by an adjustable regulating backstop screw 115 which is threaded through the upper flange portion of rear rail 3 for engagement with the tractive portion 91 of armature 90, and is secured in position after adjustment by lock nut 116.

K. *The armature leveling assembly*

The hold-magnet armature 90 is pivotally mounted at either end. As shown in Fig. 5, the rear end of armature 90 is supported by a bearing stud 109 which is secured by riveting to the web portion of rear mounting rail 3. Bearing stud 109 has an inner bearing shoulder of a diameter sufficiently large to retain the bearing in place on the inner surface of rail 3. The smaller body portion of such bearing stud 109 passes through an aperture in rail 3 and is secured in place by riveting at its outer end. The inner end portion of stud 109 is turned to form a bearing pin, of a diameter less than that of the bearing shoulder, for insertion in a hole of slightly larger diameter in the upstanding pivot tab 93 of armature 90, to form a simple thrust bearing.

The other (front) end of armature 90 is pivotally mounted on an outboard bearing pin 110, as shown in Figs. 2 and 5. The body portion of the outboard bearing pin 110 passes through an elongated opening 111 (see Fig. 2) in the face of the front mounting rail 1, which is provided for armature leveling means. The inner portion of bearing 110 is turned to form a bearing shoulder of smaller diameter to reduce the friction between the shoulder and the outer face of the armature pivot tab 93 which is thrust against it. The bearing pin 110 is further turned to a diameter smaller than that of the bearing shoulder for insertion into an aperture provided in the armature pivot tab 93, which is of slightly larger diameter, to permit the armature to pivot freely about such pin 110. By this arrangement, a simple thrust bearing is provided similar to the bearing 109 which supports the other end of the armature 90, with the exception that the outer terminating end of the outboard bearing 110 is not secured to the frame structure, as was pin 109, but is secured as by riveting, through an aperture contained in the upper portion of armature leveling plate 112. See Fig. 2.

As previously described, and as shown in Fig. 2, the outboard bearing pin 110, pivotally supporting armature 90, passes through an elongated aperture 111 in the face of rail 1 and is secured to the upper portion of armature-leveling plate 112. Plate 112 contains an elongated aperture 114 directly below the opening receiving bearing pin 110, through which screw 113 passes and is threaded into rail 1, to adjustably secure plate 112 to the outside face of rail 1. By loosening screw 113, plate 112 can be raised and lowered, because of the elongated aperture 114 therein contained through which screw 113 passes; and the attached outboard bearing 110 is consequently raised and lowered in the elongated aperture 111 in rail 1, through which it passes; to adjustably level the armature 90 in a desired position where it may be locked by tightening screw 113.

The above-described armature mounting arrangement provides for ease in armature assembly, adjustment, and removal. The armature is readily removable by backing out screw 113, disengaging bearing pins 109 and 110 from armature support tabs 93, and dropping armature 90 out of the structure.

The adjustable armature mounting arrangement serves to properly adjust the clearance under the actuating tabs 33 necessary for the selecting levers 125 in assuming their alternate selecting positions underlying the actuating tabs 33 for stackup operation after the selective action has taken place.

L. The selecting mechanism

A selecting lever 125 is provided for each pair of stackups in the switch and in its normal (unoperated) condition occupies a position midway between and below the pair of stackups. Figs. 2, 9, and 11 represent a side view of the levers 125, and show the relationship existing between such levers and a stackup-actuating tab 33. A top view of the six levers 125, vertically positioned with respect to the stackup-actuating tabs 33 of the adjoining bank, is shown in Fig. 5.

Referring particularly now to the pictorial view 18, wherein one such lever 125 is shown to comprise generally a hairpin-like structure lying in a horizontal plane, the lever 125 is composed of one piece of spring material and has one square shaped end with parallel offset sides 127. The offset side portions 127 are guided and supported within the slots 100 in the front leg portion 98 of actuating channel bar 97 and are intermediately supported by the upper edge of the rear leg 99 of bar 97.

The mid-section 126 of lever 125 consists of two parallel portions which are pinched together near the ends and terminate in open end portions 129 which are formed in semi-circular fashion to form bearing surfaces. The end portions 129 are pivotally secured by their inherent tension to the intermediate bearing 103 formed between each pair of slots 95 in the flange portion 94 of armature 90.

The slots 100 serve to guide the side portions 127 of the selecting levers 125 into their respective selecting positions under their associated stackup actuating tabs 33 for stackup selection incidental to the rotations of the selecting shafts S1—2 to S11—12.

The method of mounting selecting levers 125, as herein disclosed, provides a ready method for installing and removing such levers.

Each selecting lever 125 is moved from its normal position to one of the other of its selecting positions by the positive action of a finger spring 130 acting in response to selecting shaft rotation.

The finger spring 130, as shown in Fig. 18, comprises generally a vertically extending hairpin-shaped member constructed of a single piece of spring material shaped to form a loop 131 at one end and having two vertically extending driving arms 132 terminating in outwardly turned end portions 133.

As shown in Fig. 18, the end portions 133 are outwardly turned for ease in assembly when spring 130 is inserted into position. Arms 132, between which midportion 126 of the associated selecting lever 125 lies, serve as a yielding drive means effective to drive the associated select lever, unless retained, into any one of its three positions (the illustrated normal position, its front select position, and its rear select position), in response to the rotation of its selecting shaft in the corresponding direction.

Arms 132 are driven by neck portion 140 of finger guide 135, against which they are inwardly tensioned. These arms are contained within guide channels between parts 137 and 138. Either finger 132 moves along its guide channel, away from neck portion 140, incidental to its select lever being restrained from following rotation of the shaft.

Loop portion 131 of springs 130 rests upon the top surface of its select shaft, such as S11—12 in Fig. 18, and is retained somewhat loosely in position by tabs 139. Accordingly, the matched tension of the driving arms 132 of finger spring 130 provides for a following action of one such arm when the other arm is driven in response to the movement of finger guide 135, wherefore both arms act together as one long spring.

Each finger guide 135 has wing portions 136 which are received within slots in the upper portion of its selecting shaft, such as S11—12. The lower end portion of part 135 extends through a suitable opening in the shaft, and is riveted over on the bottom to hold it securely in place.

It will be noted, in view of the foregoing, that the spring 130 is readily inserted within the structure and is easily removable by spreading the side arms 132 to a distance wider than the supporting plate 137 and laying the spring backwards until it can be slipped off the lower part of guide 135, a mere reversal of the assembly steps.

M. Bank construction

Referring now particularly to Figs. 1, 2, and 8 to 17, the construction of the contact bank of the switch, supported on the switch frame on channels 25 to provide the vertical and horizontal rows of selectively operable stackups of contact members, will be discussed more in detail. The term "vertical" is employed in connection with the rows of stackups in the contact bank to refer to a direction across the frame, in contrast with the term "horizontal," employed to refer to a direction along the frame.

Each vertical row of stackups comprises ten principal stackups (the first ten, counting from front rail) and two extension stackups (the eleventh and twelfth). In the disclosed arrangement, each principal stackup (see Fig. 11) has six contact pairs. Functionally, they comprise an upper group of three, and a lower group of three contact pairs. Each extension stackup (see Figs. 9 and 10) comprises but three contact pairs, related specifically to the upper, or the lower, group of contact pairs in the same vertical row.

The contact bank comprises a unitary structure in that the vertical and horizontal conducting strips 156 and 160, assembled together to provide the stackups, extend entirely through the bank in the respective intersecting directions. Such strips alternate in layers, and are maintained in assembled position by clamping pileups 150, one for each support channel 25. Fig. 1 shows a top view of the first three clamping pileups 150, and the last.

As shown best in Figs. 9 to 11, each clamping pileup 150 comprises layers of conducting members, interspersed with separating insulator strips 154, clamped between an upper clamp strip 151 and a cross-support channel 25, by screws 153 which pass through the pileup.

Each clamping pileup 150, except the starting one (at the left of the switch), includes six conducting strips 156 common to the stackups comprising the vertical row immediately to the left. Such strips serve as a common multiple for the fixed contact members of all stackups in that vertical row, for the leftwardly overhanging edge portions of the conducting strips 156 comprise the fixed contact members in question. More particularly, each conducting strip 156 is wider than the insulator strips 154, and has a free edge portion extending to the left of the clamping pileup to serve as fixed-contact locations in the concerned vertical row of stackups. Each such strip 156 has a row of contact points 158 (Fig. 14B) fixed to the lower side of the overhanging left edge portion for cooperation, in pairs, with flexible travelling contact springs, 161 or 171. The overhanging edge portion of each strip 156 is notched between contact points 158 to admit more light to the zone of the contact points, and to permit a more direct view of the underlying contact springs, leaving unnotched portions 157, Figs. 14 and 14B.

Figs. 12, 13, and 14 show clearance holes 152 and 155, in clamp plate 151 and in insulators 154, for screws 153, and enlarged clearance holes 159 in conducting strips 156 for these screws. The small holes 29, shown in Figs. 5 and 14 to 17, are pilot holes which may be used during assembly of the bank for alignment of the parts, on guide pins which may be later withdrawn from underneath, as the clamp plates 151 are tightened in place.

As seen best by a comparison of Fig. 1 with Figs. 9 to 11, each clamping pileup 150, preceding the last (to the right), clampingly supports the base portion of the flexible travelling contact springs (161, 171) of the twelve stackups comprising the vertical row lying immediately to the right of such clamping pileup. There are six such springs 161 for each of the ten principal stackups in a vertical row, and three such springs 171 for each of the two extension stackups (eleventh and twelfth) in a vertical row. Any such contact spring (161, 171) extends to the right to the vicinity of the next succeeding clamping pileup 150, with its free end cooperatively underlying the overhanging left edge portion of the associated vertical multiple strip, secured in the next succeeding clamping pileup.

It will be observed that two clamping pileups are required for the first vertical row of stackups, the first to support the base portion of the flexible contact springs, the second to support the vertical conducting strips comprising the fixed contact members of the vertical row of stackups. For each vertical row of stackups succeeding the first, only a single clamping pileup is required. Each clamping pileup between the first and the last supports contact elements for two vertical rows of stackups—fixed contact elements for the immediately preceding vertical row, and travelling spring contact elements for the immediately succeeding vertical row of stackups.

In any horizontal row of principal stackups (rows 1 to 10, counting from the front of the switch), the six springs 161 of any stackup are attached integrally to respective horizontal conducting strips 160 clamped together in superposed relationship in all clamping pileups 150.

Figs. 15, 15A, and 15B show a horizontal multiple strip 160 adapted for use in any odd-numbered horizontal row of principal stackups in the contact bank. Strip 160 has the previously-mentioned pilot holes 29 for receiving locating pins extending through the clamping pileups during assembly of the bank. The arcuate portions cut from the left edge of the strip at each point 163 provide lateral clearance from the clamping screws 153. The springs 161 are formed from the material comprising the strip by blanking away metal according to the preferred outline form of the springs, leaving a connecting portion 162 intact alongside each spring 161. Leaving the springs 161 attached in a continuous horizontal strip, besides rendering it unnecessary to provide a separate horizontal multiple conductor, greatly reduces the handling of flexible spring parts before during the final bank-assembly operation, and before, as well as greatly enhancing the alignment of springs 161 in the bank. Similar considerations apply to the fixed contact parts formed integrally with the vertical conducting strips.

Each horizontal conducting strip 160 has pairs of contact points 164 affixed to the upper side of the contact springs 161 thereof in a position to mate with the pairs of contact points 158 dependingly secured to vertical strips 156. Additionally, each strip 160 has an overlying terminal member 170 fixed therewith at the starting end (the left end when assembled in the contact bank of the switch). Part 170 serves to provide a rigid terminal to which an external conductor can be attached, and serves, further, to maintain the desired spacing of the horizontal strips 160 and attached flexible springs 161 in the starting pileup 150, which lacks the vertical conducting strips 156 of the succeeding pileups 150. For this purpose, each terminal member 170 is preferably of the same thickness of material as the vertical conducting strips 156.

As indicated in Fig. 1, there are two columns of terminal members 170 for each horizontal row of stackups in the contact bank. In the preferred arrangement, strip 160, specifically as shown in Fig. 15, is employed for the first, third, and fifth overlying strips. For the second, fourth, and sixth strips in the overlying assembly, the rearwardly extending terminal portion of part 170 is preferably shifted to a point near the rear edge of strip 160. This arrangement, it will be understood, relates merely to separating the terminal points laterally to facilitate identifying them and attaching the external conductors thereto.

Considering the strips 160 as used in the even-numbered horizontal rows of principal stackups, the same blanked form is used, but turned over to place connecting portions 162 and cutout portions 163 to the front of the strip, in agreement with the showing in Fig. 1. With the blank thus turned, contact points 164 and terminal member 170 are applied to the top to form a complete strip similar to that as shown specifically in Fig. 15, but comprising a mirror image thereof.

In the specific form of the invention illustrated in Figs. 1 to 19, wherein extension stackups 11 and 12 are employed for each vertical row to double the selective capacity of the ten principal stackups therein (increase it from ten to twenty), the vertical conducting strips 156 do not have external conductors connected directly thereto, as do the horizontal conducting strips 160, for the external connections are made to the vertical conducting strips of any vertical row of stackups through the alternatively operable eleventh and twelfth (extension) stackups of the vertical row. Accordingly, the contact springs 171 of any extension stackup represent individual contact springs, not multipled with the contact springs in the extension stackups lying in other vertical rows. Each contact spring 171 in an extension stackup has the construction shown in Figs. 17, 17A, and 17 B.

As shown in Fig. 10, the contact springs 171 in any stackup of the eleventh horizontal row in the contact bank (the first extension stackup in each vertical row) occupy the upper three travelling-spring positions in the stackup for cooperation respectively with the upper three vertical conducting strips 156 in the next succeeding clamping pileup 150. As shown in Fig. 9, the contact springs 171 in any stackup of the twelfth horizontal row of the contact bank (the second extension stackup in any vertical row) lie in the lower three travelling spring positions in the stackup for cooperation with the lower three vertical conducting strips 156 in the next succeeding clamping pileup 150.

Contact spring 171, as shown in Fig. 17, with the contact points affixed to the upper side thereof, is suitable for use in the eleventh stackup in any vertical row. The pierced, forwardly extending tab portion 173 is adapted to serve as a terminal point for the connection of external conductors generally according to the circuit diagram shown in Fig. 19. Parts 173, for any stackup in the eleventh horizontal row, overlie the contact springs in the twelfth row of stackups.

For use in the twelfth horizontal row of stackups, part 171 as shown in Figs. 17, 17A, and 17B, is turned over before the contact points are fixed thereto, to bring terminal portion 173 to the front and spring portion 171 to the rear. Contact points are then fixed to the top side of the part in its turned over position to provide a part which is a mirror image of that shown in Fig. 17. Accordingly, the terminal portions 173 for any stackup in the twelfth horizontal row underlie the contact springs in the eleventh horizontal row of stackups.

It is contemplated that the three local conductors 202 (Fig. 19) for each vertical row of stackups will be installed incidental to contact-bank assembly to interconnect the terminal tabs 173 of the eleventh stackup therein respectively with terminal tabs 173 of the associated twelfth stackup. Conductors 202 are omitted from the structural views merely to simplify the drawings. During the wiring operation, the three external conductors related to the two extension stackups in the same vertical row are readily attached to the terminal tabs 173 of the eleventh stackup, which overlie the contact springs in the associated twelfth stackup.

In any intermediate clamping pileup 150, spring members 171, being of the same thickness of material as horizontal conducting strips 160, fit into the clamping pileup without special adaptation. In the first clamping pileup 150, the base portion of each spring member 171 is overlaid with a spacer 176 of a thickness to match that of the terminal members 170 secured to the starting end of horizontal strips 160 in the first ten horizontal rows. In the final clamping pileup 150, the space opposite each spring member 171 in the eleventh and twelfth horizontal rows is occupied by a spacer strip 180, Figs. 9 and 10, of the same thickness as springs 171 and strips 160.

N. *Stackup actuation*

Actuation of any stackup of the contact bank is effected by flexing the travelling springs thereof upwardly into engagement with their associated fixed contacts. For this purpose, each such stackup is provided with an actuating stud 165 or 174, shown best in Figs. 9 to 11. Actuating studs 165 are employed respectively for the stackups in the first eleven horizontal rows, while shorter studs 174 are employed for the stackups in the twelfth (second extension) horizontal row. Each such stud extends through an intermediate portion of the flexible travelling springs of its stackup, and has a step-like lifting portion extending forward at each spring level. Preferably, each contact spring is lightly tensioned downwardly against its lifting portion of the stud.

As shown best in Figs. 15 and 17, each spring 161 or 171 has a stud-receiving slot which is sufficiently elongated that an actuating stud 165 or 174 can be passed therethrough endwise. These studs are conveniently assembled with its stackup by passing it downward through the slots in the springs from above the contact bank after the latter is otherwise completely assembled. With the foot of the stud resting against its actuating tab somewhat to the rear of its illustrated position, the mid portion of all the springs of the stackup may be flexed upwardly, as by a suitable notched tool, sufficiently to permit the stud to be moved bodily forward to its illustrated effective position. When the contact springs are then released, they rest on their respective step portions to hold the foot of the stud in its socket in the underlying part 33. The top of the stud has a forward raised portion which enters a small opening forward of the stud-receiving opening to hold the top of the ladder in its illustrated forward position. When desired, a stud 165 or 174 may be removed by a reversal of the described assembly operation.

When an actauting tab 33 is raised, incidental to its underlying armature 90 operating when the concerned select lever 125 has been brought underneath such tab 33 by a stackup-selecting operation, the actuatitng stud 165 or 174 resting thereon is lifted to flex its travelling springs 161 or 171 upwardly until the contact points of each spring engage those of its corresponding vertical conducting strip 156. Any further upward movement (over-travel) of the actuating stud causes the travelling springs to bow as contact pressure is built up. The amount of the bowing of the springs, or over-travel of the actuating stud, is a fairly direct indication of the contact pressure built up at any pair. With the previously-described armature-levelling adjustment accurately made, the extent of the over-travel of the studs is the same for all stackups in a vertical row, and is determined by the previously described adjustment of the front-stop position of the associated armature 90 (by adjusting the longitudinal position of the core of its hold magnet).

O. Stackup inspection and adjustment

As is more or less apparent from the foregoing, one design aim has been to provide parts which, when assembled to form the illustrated contact bank, will function substantially as intended without requiring adjustment manipulations within the contact bank itself, except for any contact spring found to be slightly deformed (such as being bowed or twisted). To this end, the actuating-stud location is placed a substantial distance from the free end of contact springs 161 or 171, wherefore a rather generous over-travel movement of an actuating stud is required to build up a specified contact pressure. Accordingly, normal slight dimensional variations in pileup heights, in the heights of the contact points applied to parts 156, 161, and 171, and in the straightness of the parts, will cause but relatively small proportional variations in contact pressure among the contact pairs in a stackup, and from stackup to stackup in a vertical row.

A further design aim has been to so relate the parts that the point in armature travel at which any contact spring engages its fixed contact points may be directly observed; that all contact points of a stackup may be brought into view, at the same time, at least indirectly, as through a suitable mirror; and that any contact spring found to be sufficiently deformed that it does not engage one, or both, of its fixed contacts at substantially the desired point in armature travel may be readily adjusted until it does so.

Since the free end of each contact spring 161 or 171 is T-shaped, the action of the free end of the contact springs of a stackup may be directly observed by looking downwardly, and to the right, into the contact bank along both sides of the contact springs of the stackup as both ends of the crosshead of each such spring are then directly in view. When all contact springs engage at the same point in the armature travel, the free ends of all springs may be observed to stop at the same time. If one spring be seen to stop substantially before, or after, the others, a deformity is indicated, which may be compensated for by bending the spring up or down, as required. Such bending is preferably done at, or just forward of, the portion engaged by the stud 165, or 174, by a suitable tool passed down alongside the stackup, on either side thereof.

When a contact spring 161 or 171 is sufficiently twisted that one of its contact points engages substantially before the other, that fact appears from the observation that one end of the crosshead of the spring is stopped before the other. A compensating twist can be imparted to the contact spring, preferably near the base thereof, by a suitable tool inserted into the bank alongside the stackup. With respect to the first ten (principal) stackups in a vertical row, the twisting is more readily performed if the tool be inserted along the side of the stackup lying away from the portions 162 (Fig. 15) connecting the contact springs together horizontally, as there is more room on that side for manipulation of the twisting tool. For example, a comparatively large clear space exists for this purpose between the second and third stackups in any vertical row, as well as between the fourth and fifth, and so on, for the connecting parts 162 for two adjacent stackups lie in the interstackup space immediately following any odd-numbered stackup.

The placing of the contact points of a contact spring 161 or 171 far apart, near the ends of the crosshead, insures reliable twin-contact operation, in that the contact spring twists quite readily to equalize contact pressure if one point is engaged before the other. Also, if a particle of foreign matter physically blocks one contact point from engaging, its mated point nevertheless engages during the over-travel movement because of the twisting compliance of the contact spring.

When a view of the contact points themselves of a single stackup of the bank is desired, a suitable bifurcate mirror may be used, having parallel arms spaced to straddle the stackup, and respectively narrow enough to enter the free space alongside the springs of the stackup. When the arms of the bifurcate mirror enter the bank endwise along a line extending downwardly and to the right at about forty-five degrees from the plane of the bank, the image of the contact points is in view in the arms of the mirror from a position directly above the mirror.

If all the contact points of the bank are to be inspected, a suitable comb-like mirror may be employed which will show a view as above explained of contact points of all stackups in the same vertical row.

P. The hold-pilot stackups

Referring now to Fig. 8, taken along line 8—8 of Fig. 1, each hold-magnet armature, in addition to the twelve selective stackups comprising the associated vertical row of stackups in the contact bank, has what is termed a hold-pilot stackup of contacts, operated each time the hold armature is operated. As shown in Fig. 1, these hold-pilot stackups are supported on the rear portion of cross channels 25, and lie respectively opposite the vertical rows of stackups in the contact bank. They are assembled in a series of pileups clamped by pairs of screws 186. Each hold-pilot stackup contains normally-open contacts (181, 182), and an armature-restoring spring 118.

The normally-open hold-pilot contacts of a stackup consist of two fixed contact members 181 and their respective contact springs 182. Each such stackup has a lifter stud 183, supported by an actuating tab 33, the free end of which lies on the upwardly offset portion 101 of the associated hold armatures 90, whereby the hold-pilot contacts are closed upon the operation of such armature. They may, for example, indicate to a control circuit that the associated hold armature has been operated.

The armature-restoring spring 118, besides serving to return the associated hold armature 90 completely to its normal position after operation, holds the top end of actuating stud 183 in position.

Each hold-pilot stackup further contains a pair of inwardly tensioned contact springs 184 normally making electrical contact with each other. The upper spring 184 is slotted longitudinally to receive the upwardly extending stud of control button 185. Such button may be manually shifted forward underneath the downwardly offset portion of the upper spring to force the springs 184 apart, when desired. The springs may serve as a make-busy key, and are assembled in the declared location merely for economy and convenience, for they are not affected by either the operation or the release of the underlying hold armature 90.

The contact parts 181, 182, and 184 are provided with rearwardly extending terminal tabs as indicated at 187, Fig. 1.

Q. Figure 19

Fig. 19 is a diagrammatic showing of one example of electrical connections to the switch. Those stackups of the contact bank which lie in the first, second, and tenth to twelfth horizontal rows are shown for the first, second, and last vertical rows, along with hold-pilot stackups HP, and hold magnets 80 for such vertical rows. The encircled numbers 1, 2, and 10 to 12 identify the horizontal rows, or the corresponding stackups in a vertical row. Parts M1, M2, and M9 to M12 are the select magnets for corresponding horizontal rows of stackups.

Each illustrated vertical row of stackups has a separate set of three-conductors 200 associated therewith, termed inlet conductors. Twenty three-conductor outlet sets 1 to 20 are provided, two for each horizontal row of principal stackups, stackups 1 to 10 in any vertical row. Each set of inlet conductors 200 is connected to the terminals 173 of the contact springs of the extension stackups (11 and 12) in the concerned vertical row. The three-conductor outlet sets 1 to 20 are connected to the terminals 170 of the horizontal multiple strips 160, and consequently to the contact springs 161 integral therewith.

The six vertical multiple strips 156 in the physical construction are here shown in the manner of wires connecting the fixed contacts of a vertical row of stackups together in multiple, as a mere matter of convenience in the circuit diagram.

When a set of inlet conductors 200 is to be connected with one of the sets of outlet conductors 1 to 10, the concerned one of the first ten horizontal rows of stackups is selected, along with the eleventh horizontal row, and the selected stackups are actuated in the vertical row with which the last-named conductors 200 are associated. The concerned hold magnet 80 is energized for this purpose, and is held energized as long as the connection is desired. This stackup actuation connects the concerned incoming conductors 200, through the now-closed contacts of the associated eleventh stackup, the three associated conductors 156 (the upper three vertical conducting strips 156 in the concerned pileup 150), and the upper three contact pairs of the closed one of the stackups 1 to 10 in the vertical row, to the associated outlet set 1 to 10. While all six contact pairs in the stackup last-mentioned are closed, the closure of the lower three contact pairs is a mere ineffective operation at this time, as the associated conductors 156 remain open at the normally open contacts of the unoperated twelfth stackup.

When the same inlet conductors 200 are to be connected with one of the sets of outlet conductors 11 to 20, the operation is the same except that the concerned twelfth stackup is selected and actuated, rather than the eleventh stackup. In this operation, the lower three contact pairs of the actuated principal stackup, and the lower three conducting strips in the pileup 150, are effective rather than the upper three.

Fig. 19 further shows electrical connections for the illustrated hold magnets 80, hold-pilot contacts 181 and 182, and make-busy contacts 184.

The off-normal contact springs 75 associated with the pairs of select magnets, through their selecting shaft, such as S1—2, are shown arranged in a typical circuit. To complete such circuit, the contacts 75 associated with the selecting shaft S11—12 and the contacts 75 associated with one of the other five selecting shafts must be closed. The closing of the off-normal contacts 75 may indicate to a circuit, such as a control circuit, that the selecting action has been completed.

II. OPERATION

Operation of the disclosed switching arrangement will now be described.

A. Select-magnet operation

As pointed out in connection with Fig. 19, two selective stackups are required to be operated for any connection through the switch, a principal stackup (horizontal rows 1 to 10) and an extension stackup (horizontal rows 11 and 12).

The selection of the stackups comprising the first and eleventh horizontal rows (stackups 1 and 11 in any vertical row), to thereby select outlet conductors 1 of Fig. 19, will now be described.

Selection of the first horizontal row of stackups occurs responsive to an energization of the select magnet M1 (Figs. 1, 3, 4, and 19). The underlying wing 53 of the associated armature 51 is thereby attracted upwardly into engagement with magnet M1, whereby the first shaft S1—2 is rotated in a counterclockwise direction as viewed in Fig. 4. Thereupon, select fingers 135 of shaft S1—2, one for each vertical row of stackups, are tipped forward toward a position underlying horizontal row 1. At each idle vertical row of stackups (at which the hold armature 90 is in normal position), tipping select finger 135 of shaft S1—2 forward acts, through finger springs 130, to rotate the associated selecting lever 125 forwardly about its pivot 103 toward an effective position below the first horizontal row. The front offset-side portion 127 of each such selecting lever 125 is thereupon brought effectively beneath its actuating tab 33 (Fig. 11) of the first horizontal row of stackups. This preferably occurs, for any lever 125, just as the lever is about to strike the end of its guide slot 100. The first stackup is thereby selected in each idle vertical row in the switch.

The selecting shaft may be arranged (by core adjustment of the select magnets) to rotate through a slightly larger angle than is required for the select levers 125 to reach stop position (at the end of slots 100) to insure that all the selecting levers rotate a sufficient amount. This excess shaft rotation is permitted by virtue of the inherent flexibility of the disclosed finger springs 130. The concerned driving arms 132 of each finger spring 130 merely yield as soon as the offset side 127 of the selecting lever 125 reaches its stop position in its slot 100.

If any vertical row of the switch is in use when the selective action just described occurs, the raised condition of the actuating channel bar 97 of its hold armature 90 causes the concerned offset side portion 127 of the selecting lever 125 of such vertical row to strike the side of the concerned depending actuating tab 33, as may be seen best in Fig. 18. This action prevents such select lever 125 from reaching selecting position, but the full stroke of the select shaft is not thereby interfered with, as the concerned driving arm 132 of the associated finger spring 130 merely flexes as the select shaft completes its movement.

As seen best in Figs. 2 and 4, the above-described rotation of shaft S1—2 tips the attached shaft-positioning roller stud 70 forward. The roller 69 carried on stud 70, is thereby moved toward the front of the switch, from its position at the center of the V-shaped portion at the lower end of cam member 66. Cam member 66 is thereby thrust inwardly against the tension of cam spring 65. When the shaft movement is nearly completed, shaft off-normal springs 75 are brought into engagement by stud 76 carried by cam member 66.

Selection of the eleventh horizontal row (stackup 11 in any vertical row) is accomplished by energizing the eleventh selecting magnet M11, to rotate shaft S11—12 as described for shaft S1—2.

B. *Hold-magnet operation*

Following the above described selecting action of horizontal rows 1 and 11 to thereby select outlet conductors 1, Fig. 19, and while the concerned magnets M1 and M11 are maintained energized, the hold magnet 80 associated with any idle set of inlet conductors 200 is energized. The depending tractive portion 91 of its hold armature 90 is thereupon attracted downwardly into engagement with the protruding end 81 of the core of magnet 80, rotating the armature structure about the pivotal mounting arrangement hereinbefore described. This action rotates and raises the attached actuating channel bar 97 with all its selecting levers 125. Each such lever 125 passes ineffectively between the associated actuating tabs 33, except in the case of the selected first and eleventh stackups. There, the actuating tabs 33 of the first and eleventh stackups of this bank are raised by the now underlying bridging portions of the first and sixth selecting levers 125. The overlying lifter studs 165 (see Fig. 11) of the first stackup, and the lifter stud 175 (see Fig. 10) of the eleventh stackup are thereby raised, carrying upwardly their contact springs 161 and 171.

When the armature stroke is only partially completed, the contacts carried on the forward end of the flexible springs 161 and 171 encounter those depending from the teeth portion 157 of the respective associated fixed contact strips 156. The final portion of the movement of the armature causes bowing of the springs 161 and 171, whereby contact pressure is built up at all concerned points. The hold magnet 80 of the concerned vertical row is maintained energized for so long a time as the connection established is to remain intact.

The contacts 181 and 182 of the associated hold-pilot assembly are closed responsive to any operation of an armature 90, irrespective of which stackups in its vertical row are selected and operated.

C. *Select-magnet restoration*

The energized select magnets (M1 and M11 in the assumed example) may be deenergized immediately following the operation of the hold armature 90. When this occurs, the cam springs 65 and cam members 66 associated with the rollers 69 and roller studs 70 attached to the concerned selecting shafts S1—2 and S11—12 act to return such rollers, studs and selecting shafts to their normal positions. The rollers 69 act reversely in their associated V-notched portions of cam members 66 for this purpose. The normal position of a shaft is reached when its rollers 69 strikes the lowest portion of such notch. Responsive to the return movement of cam 69, the concerned shaft off-normal springs 75 again assume their separated condition illustrated in Fig. 2.

When the selecting shafts S1—2 and S11—12 are returned to normal position, their unused selecting levers 125 return with them, but those levers 125 through which the selected stackups in the concerned bank were operated are held in selecting position by the downward pressure exerted by the flexible blades in the actuated stackups. The rear driving arms 132 of the concerned finger springs 130 remain in selecting position, and flex as the selecting shafts S1—2 and S11—12 return to normal position, while the associated front driving arms 132 return with the shaft.

D. *Hold-magnet restoration*

When the energized hold magnet 80 is subsequently deenergized, the armature 90 thereof rotates back to its normal position by virtue of the weight of the actuating channel bar 97 thereof, assisted by the downwardly exerted spring tension of the armature-restoring spring 118 (Fig. 8) in the hold-pilot assembly. The tension of the flexible spring contacts in the operated selective stackups assist in the initial portion of the return movement.

When the descending channel bar 97 is lowered, the first and sixth selecting levers 125 are released from the first and eleventh actuating tabs 33, whereupon the spring action of the rear driving arms 132 of finger springs 130, exerted against the intermediate portion 126 of selecting levers 125, causes the selecting levers to re-align themselves with the finger springs 130 of the associated shafts S1—2 and S11—12, to the position shown in Figs. 5 and 18.

E. *Selecting other outlets*

In the preceding example, outlet 1, comprising the three conductors connected to the upper three conducting strips of the first horizontal row of stackups (see Fig. 19), was selected by a selection of the first and eleventh horizontal rows of stackups, followed by an actuation of the selected stackups in a desired vertical row to connect the inlet conductors 200 of such vertical row respectively to the conductors in outlet 1.

If the conductors in outlet 11, represented by the lower three conducting strips in the first horizontal row, are to have a connection extended thereto, the selection is the same except that the twelfth rather than the eleventh horizontal row of stackups is selected along with the first horizontal row. This is accomplished by an energization of select magnets M1 and M12, to rotate their associated shafts (S1—2, S11—12) in the concerned directions. With this selection in effect, energization of any hold magnet 80 operates its associated hold armature 90 to close the first and twelfth stackups in the associated vertical row. With the twelfth stackup in the concerned vertical closed, rather than the eleventh, the lower three of the vertical conducting strips 156 are effective rather than the upper three, and the concerned inlet conductors 200 are connected respectively with the conductors in outlet 11 rather than with the conductors in outlet 1.

Outlets 2 to 10 are employed by selecting and actuating the corresponding one of principal stackups 2 to 10, along with extension stackup 11 in the desired horizontal row. Outlets 12 to 20 are employed by selecting and operating the corresponding one of principal stackups 2 to 10, in a vertical row, along with its extension stackup 12.

It will be apparent, of course, that any outlet which stands currently selected (by a selection of the desired horizontal row of principal stackups along with the desired horizontal row of extension stackups) may have any desired one of the inlet paths 200 connected thereto, depending upon which hold armature is operated, by its associated hold magnet 80.

MODIFIED BANK CONSTRUCTION; FIGS. 20 TO 24

The modified bank construction shown in Figs. 20 to 24 will now be described.

*Fig. 20*

Referring first to Fig. 20, the bank construction shown therein provides the same number and arrangement of vertical and horizontal rows of stackups, and the same number and arrangement of inlet and outlet conductors, as in the principal embodiment. The difference lies in the vertical and horizontal conducting strips, the function of which has been reversed with respect to the provision of flexible contact springs of the stackups and the fixed contact members therefor.

In Fig. 20, parts 1, 3, and 25, are respectively the front and rear rails of the switch frame, and the channel-like cross members secured thereto, as in the principal embodiment. The clamping pileups in Fig. 20 are identified as 250. Each is similar to the clamping pileups 150 in the principal embodiment, except for the noted altered construction of the vertical and horizontal conducting strips clamped therein.

Members 261 are flexible contact springs corresponding to parts 161 in the principal embodiment. But, instead of being formed integrally with the horizontal conducting strips, these contact springs are formed integrally with vertical conducting strips 356, which replace vertical conducting strips 156 in the principal embodiment. Each strip 256 may be termed a comb-like member with contact springs 261 comprising the teeth thereof. Each vertical conducting strip 256, therefore, is constructed of relatively thin sheet metal. Preferably, the springs 261 are omitted from the eleventh stackup position of the lower three strips 256 in any clamping pileup, and are omitted from the twelfth stackup position of the upper three strips 256 therein.

The horizontal conducting strips 160 of the principal embodiment are replaced in Fig. 20 by horizontal conducting strips 260, which are similar except that they are formed to provide fixed contact members rather than the flexible contact springs, and they may, consequently, be constructed from relatively thick sheet metal.

Each strip 260 includes a comparatively wide portion for inclusion in each clamping pileup 250, and a comparatively narrow portion 262 joining the clamped portions together in a continuous strip. The portion of a strip 260 clamped in each clamping pileup 250 succeeding the first has a part which overhangs the pileup to the left, to which depending contact points may be affixed in registry with those carried on the upper side of contact springs 261.

Terminal portions 270 are formed integrally with the respective horizontal conducting strips 260.

The fixed contact members for the eleventh and twelfth horizontal rows of stackups are provided, in each clamping pileup 250 succeeding the first, by conducting parts 272 clamped therein on a level with the respective layers of horizontal conducting strips 260. Each part 272 has a terminal portion 273 extending from the right edge thereof, and a contact portion extending from the left edge thereof, to overhang the free end of its associated contact spring. The lower three members 272 in a clamping pileup are assembled with the overhanging contact portion in the twelfth stackup position, and with the terminal portion 273 aligned with the eleventh horizontal row of stackups, while the parts 272 for the upper three positions in the clamping pileup are reversely assembled, as shown, to serve as contact members in the eleventh horizontal row of stackups.

*Figs. 21 to 24*

Figs. 21 to 24 show the modified type of bank construction according to Fig. 20 applied to a narrower contact bank having only ten horizontal rows of stackups, serving only ten sets of outlet conductors, rather than twenty. The principal difference resides in the fact that the vertical conducting strips 356, together with the other parts in clamping pileups 350, are shorter, leaving vacant the space above cross members 25 occupied in the other embodiments by the horizontal rows of extension stackups, the eleventh and twelfth.

The flexible contact springs 361 of the several stackups represent parts formed integrally with respective vertical conducting strips 356. Each vertical conducting strip 356 has a terminal portion 373 formed as an integral end extension thereof, to which the inlet conductors may be attached. Having no extension stackups, the switch of Figs. 21 and 22 does not require the sixth select shaft (S11—12) of the other modification, nor its associated parts.

Tabs 391 (Figs. 21 and 22), formed on the front ends of vertical conducting strips 356, extend forward from the clamping pileups 350 in which strips 356 lie. They may be contacted by a suitable test plug to provide a test connection to the vertical conducting strips and the inlet conductors (not shown) attached thereto. Similar tabs may be provided for the construction of Fig. 20, as indicated thereon.

As seen in Fig. 22, a front view of the structure shown in Fig. 21, there are three contact pairs in each stackup, which is the arrangement used when there are three conductors in each inlet or outlet path.

In Fig. 23 a horizontal conducting strip 260 as used in the structure of Figs. 20 to 22 is shown after blanking, but before being positionally specialized to provide a staggered arrangement of the terminals 270. One or another of the terminal portions 270 is to be removed from the strip before its assembly into the contact bank, as by a cut-off operation, leaving the terminal in one position for an odd-numbered strip in the pileup, and in the other position for an even-numbered strip.

Fig. 24 is a showing of a vertical conducting strip 356 of Fig. 21 after blanking, but before one of the terminal portions 373 has been removed to specialize it for an odd-numbered, or an even-numbered position in the pileup to secure a staggering of the terminal portions left attached.

Although the disclosed switch is shown and described as being mounted in a horizontal position, it will be understood that it may be mounted in any desired other position. Expressions such as vertical, horizontal, front, rear, and the like, have been used chiefly for clarity and convenience. It will be understood, of course, that any of such expressions as may be used in the following claims are merely relative, and are not to be construed as limiting.

I claim:

1. In a crossbar switch wherein sets of contact members are arranged in vertical rows and horizontal rows for the operation by a hold bar of any set in a vertical row subject to its lying in a horizontal row selected by a select bar, a mounting frame, a contact bank including the said sets, said bank being mounted on the frame and lying outside the confines thereof, select bars and hold bars lying within the frame and supported thereby in operative relationship to the vertical and horizontal rows of sets included in the contact bank, and means including select fingers attached to the select bars and select members controlled thereby for operatively coupling any contact set of any vertical row to its corresponding hold bar.

2. In a contact bank, contact members comprising stackups located at respective cross points of vertical and horizontal rows in which they lie, each stackup including superposed movable contact members extending along the horizontal row in which the stackup lies, fixed contact members disposed in overlapping relationship with one end of the respective movable members of each stackup, vertical and horizontal conducting strips secured in place in the contact bank in interspersed layers to form vertical and horizontal groups of superposed strips, the vertical groups lying alongside of respective vertical rows of stackups, the horizontal groups lying alongside of respective horizontal rows of stackups, the contact members of the stackups comprising lateral extensions of the said vertical and horizontal strips.

3. In a contact bank, superposed lattices of vertical and horizontal conducting strips secured in place therein defining shaft-like openings through the lattice work, and stackups of contact members located within respective ones of said openings, the contact members of any said stackup being electrically connected to respective vertical and horizontal strips adjoining the opening in which the stackup is located, a portion of the members of each stackup comprising blade-like members disposed crosswise of the opening and generally parallel to the plane of the lattice work, each said blade-like member being sufficiently narrow and being so located within the opening that a substantial clear space remains between the edges of said members and the sidewalls of the opening, whereby the members may be inspected and adjusted through the said clear space.

4. In a contact bank, superposed lattices of vertical and horizontal conducting strips secured in place therein defining shaft-like openings through the lattice work, stackups of contact members located within respective ones of said openings, each said stackup including contact members comprising integral portions of respective adjoining conductors extending in one direction, such contact members extending across the opening into overlapping relationship with portions of adjoining conductors extending in the other direction, the last said contact members being sufficiently narrow and being so located within the opening that a substantial clear space remains between the edges of the said members and the sidewalls of the opening, whereby the members may be inspected and adjusted through the said clear space.

5. In a contact bank, flexible contact blades comprising stackups lying side by side in each of succeeding first rows, said stackups forming second rows intersecting the first rows, the contact blades of the stackups extending along said second rows, means in the contact bank supporting one end of the blades of each stackup, leaving the other end free, each stackup having contact parts overlappingly related to the free end of the respective blades thereof, the free end of each blade being laterally, or edgewisely, offset from the remaining portion thereof to enhance visual inspection of the relation between the contact blades of any stackup and their respective overlapping contact parts.

6. In a contact bank, flexible contact blades comprising stackups lying side by side in each of succeeding first rows, said stackups forming second rows intersecting the first rows, the contact blades of the stackups extending along said second rows, means in the contact bank supporting one end of the blades of each stackup, leaving the other end free, the free end of each blade having opposed portions laterally, or edgewisely, offset from the remaining portions thereof to enhance visual inspection of the respective positions occupied by the free end of the blades in a stackup, and contact parts for each stackup overlappingly related to the pairs of laterally offset portions of the respective blades thereof.

7. In a contact bank, flexible contact blades comprising stackups lying side by side in each of succeeding first rows, said stackups forming second rows intersecting the first rows, the contact blades of the stackup extending along said second rows, means in the contact bank supporting one end of the blades of each stackup, leaving the other end free, each blade having a crosshead at the free end thereof providing opposed laterally, or edgewisely, offset portions, rigidly fixed contact parts for each stackup overlappingly related to the laterally offset portions of the respective blades thereof, and means for flexing the blades of any stackup in unison to bring the laterally offset portions of each into and out of contact with their respective overlapping parts, each blade having sufficient torsional flexibility that the making of premature contact by one offset portion thereof results in a twisting of the blade to enable the opposed offset portion to make contact.

8. In a crossbar switch, a mounting frame including end members and front and rear mounting rails secured thereto, cross members extending between said rails and supported thereon, a contact bank disposed above said rails and supported on said cross members, said bank including contact members comprising actuatable stackups disposed in rows extending across the frame and succeeding each other along the frame, and actuating bars disposed between said rails and supported thereon independently of said cross members in operative relationship with said rows respectively, whereby the contact bank may be produced and assembled with the frame structure either before or after the actuating bars are assembled therewith.

9. In a crossbar switch, a mounting frame including end members and front and rear mounting rails secured thereto, cross members extending between said rails and supported thereon, a contact bank disposed above said rails and supported on said cross members, said bank including contact members comprising actuatable stackups disposed in rows extending across the frame and succeeding each other along the frame, actuating bars disposed between said rails and supported thereon independently of said cross members in operative relationship with said rows respectively, and electromagnets disposed along and mounted on one rail of the frame in operative relationship with the respective actuating bars, whereby the contact bank may be produced and assembled with the frame structure either before or after the said actuating bars and electromagnets are assembled therewith.

10. In a crossbar switch, a mounting frame including end members and front and rear mounting rails secured thereto, cross members extending between said rails and supported thereon, a contact bank supported on said cross members, said bank including contact members comprising actuatable stackups disposed in rows extending across the frame and succeeding each other along the frame, actuating bars pivotally supported between said rails in operative relationship with said rows respectively, and means including parts individual respectively to said actuating bars and individually shiftable with respect to the remainder of the structure for shifting one pivot point of any actuating bar toward and away from the contact bank to compensate for irregularities of construction.

11. In a switch structure, a horizontal frame including end members, and front and rear mounting rails secured thereto, each rail including an upright main portion surmounted by a longitudinal flange turned inwardly toward the other rail, the rear rail having an inwardly turned lower longitudinal flange, cross members supported on the opposed upper flanges of the rails, cross rows of contact sets supported on the cross members, armature bars pivotally mounted directly on and extending between the rails in underlying operative relationship to the respective cross rows, and upright electromagnets mounted on and extending along the lower flange of the rear rail in underlying operative relationship to the respective armature bars, whereby the said cross rows of contact sets, the said armature bars, and the said electromagnets may be separately assembled with the frame structure, either without the other two.

12. In a switch structure, a horizontal frame including end members, and front and rear mounting rails secured thereto, each rail including an upright main portion surmounted by a longitudinal flange turned inwardly toward the other rail, the rear rail having an inwardly turned lower flange, cross rows of contact sets supported on the opposed upper flanges of the rails, generally horizontal armature bars pivotally mounted between the rails in underlying operative relationship to the respective cross rows, and upright electromagnets mounted along the lower flange of the rear rail in underlying operative relationship to the respective armature bars, backstop screws for the respective armature bars threadedly received in the upper flange of the rear rail for adjusting the back limit of armature-bar stroke, and means for adjusting the effective height of the respective electromagnets to thereby adjust the front limit of armature-bar stroke.

13. In a crossbar switch employing pivoted select bars each rotatable in alternative directions from a normal position to select respective corresponding rows of stackups, and employing intersecting hold bars to operate chosen selected stackups, frame means providing opposed pivot plates between which the select bars extend, operating magnets for the select bars lying outside the plates in respective association therewith, armatures attached respectively to the select bars at points within the plates and extending to points outside the plates into operative association with respective ones of said magnets, and means lying within the pivot plates for returning the select shafts to their respective normal positions, the said returning means for each shaft including a radial arm attached thereto, and a cooperating pressure arm turnably supported on the plate at a point generally in alignment with the radial arm for movement confined to a direction generally along the shaft, one arm carrying a V-shaped cam, the other arm carrying a camming member lying within the cam.

14. In a crossbar switch, a frame, a select shaft journalled therein for rotation in opposite directions from a normal position to respective selecting positions, first and second cooperating members, mean supporting one member on the shaft, means supporting the other member on the frame, one member carrying a V-shaped cam within which the other member lies, means normally urging the members together with said other member contacting both sloping sides of the cam, rotation of the shaft to either said selecting position bringing the said other member away from a side slope of the cam to a position on the other side slope, said means for supporting the members and for normally urging them together comprising means supporting one of them relatively rigidly on the concerned part and for supporting the other one of them yieldingly on the concerned part and guiding it for movement longitudinally of the shaft incident to the said relation of the shaft.

15. In a crossbar switch including contact members comprising stackups arranged in vertical and horizontal rows, rotatable select shafts extending along respective horizontal rows, each select shaft having a row of select fingers fixed therewith and spaced along the shaft to correspond with the spacing of the stackups along a horizontal row, each select finger including opposed spring arms, and stackup-selecting devices lying between the spring arms of the respective select fingers.

16. A select finger for use in a crossbar switch comprising a relatively stiff finger member and a pair of opposed inwardly tensioned flexible spring members attached near one end thereof and extending along the finger member to a point beyond the other end thereof, said other end of the member including a part serving to engage the inwardly tensioned spring arms and keep the free ends thereof a desired distance apart, such other end also including structure providing a slot for each spring arm to guide it for movement away from the other spring arm.

17. In a crossbar switch, contact members comprising stackups located at the intersecting points of rows in which they lie, said rows extending in first and second intersecting directions along a horizontal plane, each stackup arranged to be actuated by a movement upwardly from said plane, selecting members for the respective stackups, each member normally lying in said plane laterally displaced from a point beneath its stackup, hold bars lying below said plane and extending along respective rows in the first direction, means for lifting any hold bar to actuate any stackup of the row along which it extends subject to the selecting member of such stackup having been moved beneath the stackup, select bars extending along respective rows in the second direction, and means for rotating any select bar to move the selecting members for the row along which it extends effectively beneath their respective stackups.

18. A hold bar adapted to underlie a row of stackups of a crossbar switch and to rotatably support a row of select levers spaced along the bar in association with respective stackups in the row, said bar being adapted to pivot about a longitudinal axis, pivot members for the select levers lying in a row extending along the pivot axis and lying relatively close thereto, and structure providing parallel support surfaces for the select levers, said support surfaces extending along the bar relatively far from the pivot axis and lying in a common plane with the pivot members.

19. In a crossbar switch, select levers each of open ended hairpin-like construction with the open end members shaped to grip a pivot to secure the levers for edgewise rotation into and out of a selecting position, a hold bar adapted to underlie a row of stackups of the crossbar switch and to support said select levers side by side in a row extending along the bar in association with respective stackups, said bar providing a row of pivot members operatively engaged by the shaped open end members of the respective select levers, and structure providing a row of aligned guide slots receiving the closed end of the select levers.

20. A hold bar adapted to underlie a row of stackups of a crossbar switch and to rotatably support a row of open-ended select levers spaced along the bar in association with respective stackups in the row, said bar being adapted to pivot about a longitudinal axis, said bar including an elongated plate-like principal member having an upstanding wall portion defining an edge thereof extending along its pivot axis, said wall portion having a series of perforations to provide pivots for the open end portions of the respective select levers between succeeding perforations, a channel member secured along the opposed edge of the principal member, having an upstanding wall ending in a lever-supporting surface level with said row of perforations, said channel member having a longer upstanding wall having a row of axially elongated lever-guide perforations located at such a height as to receive the levers mounted on said pivots and to assist said lever support surface in supporting the levers for lifting loads applied thereto between the upstanding walls of the channel member.

21. In a crossbar switch, contact members comprising actuatable stackups arranged in vertical and horizontal rows, actuating bars underlying the respective rows, select members arranged in rows corresponding respectively to the vertical rows of stackups, each select-member row lying between its corresponding stackup row and the underlying actuating bar, movement of any actuating bar toward the overlying row of stackups serving to operate any stackup thereof subject to an associated select member having been interposed between it and the actuating bar, backstop bars underlying the vertical rows of stackups respectively, each stackup normally resting on its underlying backstop bar, means for adjusting the height of any backstop bar to regulate the height position of the stackups in the overlying vertical row, and means for adjusting the normal height of any hold bar to leave a desired clearance for the free movement along the hold bar of any associated select member into and out of a position of interposition between the hold bar and an associated stackup.

22. In a crossbar switch, contact members comprising a row of normally open pairs, an actuating bar extending along the row, select arms corresponding respectively to contact pairs and lying in a row between the row of contact pairs and the actuating bar, movement of the actuating bar toward the row of contact pairs serving to close any pair subject to its associated select arm having been interposed between it and the actuating bar, a backstop bar lying between the row of contact pairs and the actuating bar, each pair having a part normally resting on the backstop bar to limit the open distance between the contact members of the pair, adjustment means facilitating moving the backstop bar toward and away from the normal position of the actuating bar to regulate the open distance between the contact members of the several pairs, and means for adjusting the normal position of the hold bar toward and away from the backstop bar to leave a desired clearance for the free movement along the hold bar of any select arm into and out of a position of interposition between the hold bar and an associated contact pair.

RICHARD P. ARTHUR.

REFERENCES CITED

The following references are of record in the file of this patent:

UNITED STATES PATENTS

| Number | Name | Date |
|---|---|---|
| 1,480,202 | Goodrum | Jan. 8, 1924 |
| 1,541,343 | Goff | June 9, 1925 |
| 1,551,190 | Craft | Aug. 25, 1925 |
| 1,579,836 | Powell | Apr. 6, 1926 |
| 2,021,329 | Reynolds | Nov. 19, 1935 |
| 2,047,383 | Reynolds | July 14, 1936 |
| 2,120,413 | Mathies | June 14, 1938 |
| 2,166,764 | Mathies | June 18, 1939 |
| 2,282,687 | Vigren | May 12, 1942 |
| 2,300,471 | Mallina | Oct. 27, 1942 |
| 2,317,469 | Mallina | Apr. 27, 1943 |
| 2,322,219 | Boswau | June 22, 1943 |
| 2,350,458 | Hibbard | June 6, 1944 |
| 2,354,660 | Bellamy | Aug. 1, 1944 |
| 2,434,373 | Svensson | Jan. 13, 1948 |
| 2,447,010 | Harrison | Aug. 17, 1948 |
| 2,476,789 | Wiberg | July 19, 1949 |
| 2,490,665 | Bellamy | Dec. 6, 1949 |
| 2,517,022 | Peek | Aug. 1, 1950 |
| 2,517,679 | Knos | Aug. 8, 1950 |

FOREIGN PATENTS

| Number | Country | Date |
|---|---|---|
| 225,932 | Great Britain | Dec. 11, 1924 |